(12) United States Patent
Loveland

(10) Patent No.: US 6,826,539 B2
(45) Date of Patent: Nov. 30, 2004

(54) VIRTUAL STRUCTURE DATA REPOSITORY AND DIRECTORY

(75) Inventor: James B. Loveland, Orem, UT (US)

(73) Assignee: Xactware, Inc., Orem, UT (US)

(*) Notice: Subject to any disclaimer, the term of this patent is extended or adjusted under 35 U.S.C. 154(b) by 0 days.

(21) Appl. No.: 09/544,367

(22) Filed: Apr. 6, 2000

(65) Prior Publication Data

US 2002/0161608 A1 Oct. 31, 2002

Related U.S. Application Data

(60) Provisional application No. 60/174,113, filed on Dec. 31, 1999.

(51) Int. Cl.[7] ............................................. G08F 17/60
(52) U.S. Cl. ............................................. 705/7; 705/4
(58) Field of Search ........................... 705/1, 4, 7, 26, 705/38; 345/619

(56) References Cited

U.S. PATENT DOCUMENTS

| | | | | |
|---|---|---|---|---|
| 4,831,526 A | * | 5/1989 | Luchs et al. ................... 705/4 |
| 5,432,904 A | | 7/1995 | Wong .......................... 395/161 |
| 5,504,674 A | | 4/1996 | Chen et al. .................. 364/401 |
| 5,584,025 A | * | 12/1996 | Keithley et al. ............. 707/104 |
| 5,736,977 A | | 4/1998 | Hughes ....................... 345/326 |
| 5,754,850 A | | 5/1998 | Janssen ....................... 395/615 |
| 5,781,773 A | | 7/1998 | Vanderpool et al. ........ 395/611 |
| 5,794,216 A | | 8/1998 | Brown ......................... 705/27 |
| 5,802,501 A | * | 9/1998 | Graff ........................... 705/36 |
| 5,842,148 A | * | 11/1998 | Prendergast et al. .......... 702/34 |
| 5,845,255 A | * | 12/1998 | Mayaud .......................... 705/3 |
| 5,857,174 A | | 1/1999 | Dugan ............................ 705/1 |
| 5,862,325 A | * | 1/1999 | Reed et al. .................. 709/201 |
| 5,870,733 A | | 2/1999 | Bass et al. ..................... 707/2 |
| 5,878,416 A | | 3/1999 | Harris et al. .................. 707/10 |
| 5,913,210 A | * | 6/1999 | Call ............................... 707/4 |
| 5,920,849 A | * | 7/1999 | Broughton et al. .......... 705/400 |
| 5,950,169 A | | 9/1999 | Borghesi et al. ............... 705/4 |
| 5,991,876 A | * | 11/1999 | Johnson et al. ............. 713/200 |
| 6,061,692 A | * | 5/2000 | Thomas et al. .............. 707/200 |
| 6,064,979 A | * | 5/2000 | Perkowski .................... 705/26 |
| 6,101,534 A | * | 8/2000 | Rothschild ................... 709/217 |
| 6,115,709 A | * | 9/2000 | Gilmour et al. ............... 707/9 |
| 6,185,540 B1 | * | 2/2001 | Schreitmueller et al. ....... 705/4 |
| 6,201,546 B1 | * | 3/2001 | Bodor et al. ................. 345/430 |
| 6,226,650 B1 | * | 5/2001 | Mahajan et al. ............ 707/201 |
| 6,345,258 B1 | * | 2/2002 | Pickens ......................... 705/1 |
| 6,473,794 B1 | * | 10/2002 | Guheen et al. ............. 709/223 |
| 2002/0032626 A1 | * | 3/2002 | DeWolf et al. ............... 705/35 |

FOREIGN PATENT DOCUMENTS

JP  11-96217 A  *  4/1999  ........... G06F/17/60

OTHER PUBLICATIONS

Piper, James. "A New Spin on Facility Management." Building Operating Management, vol. 46, No. 7, p. 36 (start page), Jul. 1999.*

* cited by examiner

Primary Examiner—Susanna M. Diaz
(74) Attorney, Agent, or Firm—Kirton & McConkie; Michael F. Krieger

(57) ABSTRACT

The present invention relates to a computer accessible system for electronically storing a model which communicates the physical attributes of a structure along with warranty, insurance and other information relative to that structure. The system of the present invention integrates physical information in a model which is displayed as a physical representation of the structure with other non-physical information. Selecting specific areas of the model provides access to data regarding physical or non-physical characteristics of that area of the structure and the contents thereof. Data relevant to warranties, insurance, maintenance or other information can be accessed by selecting portions of the model or indices attached or related to that portion. Equipment, appliances and other items within the structure may also be controlled by access through the computer model. Systems of the present invention allow multiple users to remotely access the information and model via a computer network, such as the Internet, in order to make informed decisions regarding the structure and its characteristics.

8 Claims, 24 Drawing Sheets

VIRTUAL STRUCTURE DATA REPOSITORY AND DIRECTORY

This application claims benefit of 60/174,113 filed Dec. 31, 1999.

THE FIELD OF THE INVENTION

The present invention relates to methods and apparatus for storage and retrieval of information relating to a structure, such as a home, office, boat, vehicle or similar structure and appurtenances to that structure. The information is stored electronically on a computer-based system and may be accessed directly from a single computer or over a computer network. Information about the structure's physical attributes can be stored as a two- or three-dimensional model of the structure which can be viewed on a display. A model database may also be queried for specific details such as room dimensions, materials, and areas. The contents of each room or compartments may also be stored in the system including floor and wall coverings, equipment, and instruments. Embodiments of the present invention may also record details of furniture, electronics, and semi-stationary items such as vases, artwork and appliances. In addition to physical attributes and contents, the system can store information regarding required and recommended maintenance schedules, warranty requirements and terms, insurance details, dates of purchase, vendor identification, anticipated life spans and other information pertinent to a structure, its history, its contents, its condition, its occupants or related items.

BACKGROUND

Modern buildings and other structures are typically designed and built to last for a century or more. During their lifetimes structures can undergo extensive changes, but often retain key structural elements throughout their usable lives. While these key elements remain somewhat static, other structure elements can change relatively quickly. Building framing and structural elements remain fairly static while paint, carpet and other wearable items are replaced regularly. When items are replaced, the owner will typically arrange for a contractor to measure the element that needs to be replaced and estimate the cost of replacement. This will generally involve a trip to the site by the contractor or other tradesman who will measure the item and estimate a cost for replacement or repair. For each item, an owner may solicit several estimates necessitating several trips and several measurements so that each estimator may calculate a bid for the project.

Projects can be further complicated by warranties and insurance policies with requirements and restrictions which must be met by participating contractors and the owner. Often an insurance adjustor must also visit the site and make independent measurements and assessments.

Sometimes, a history of what has happened to the structure is required for insurance or warranty purposes. This information may also need to be solicited by multiple parties making repeated dissemination by the owner tedious and error-prone.

When a structure changes ownership, some warranties and insurance policies will carry over to the new owner. Information pertinent to the structure and the policies must be accurately transferred between the old and new owners. This process will often be neglected or forgotten and inaccurate or false information will result. It is also beneficial to have a record of the tradesman and their addresses in case the work performed is faulty.

Furniture, artwork, appliances and personal items that are kept within a structure may also be covered by various insurance policies and warranties. An accurate inventory of these items and information regarding their coverage can be a valuable asset. Especially when theft or fire occurs, an accurate inventory including the location of the items will be invaluable in settling insurance and warranty claims.

A record of the location of valuable documents can also be an asset. Wills, investment records, deeds and other important documents may be located in a location hidden in the structure. A password-protected confidential location for these documents would be beneficial for access by specific relatives or personnel when needed.

An accurate and descriptive database including a three-dimensional model, photographs and listings of contents, warranties and other information can also be a great asset at the time a structure is sold. When a buyer can access all this information from one source, both the buyer and seller will benefit from a more informed negotiation and deal.

SUMMARY AND OBJECTS OF THE INVENTION

Some embodiments of the present invention provide an electronic model and data storage system for storage of a structure's physical attributes and other information related to the structure. Some embodiments combine a two- or three-dimensional model of the physical features of a structure with a database or file structure which comprises additional non-physical information including, but not limited to, warranty information, maintenance requirements and recommendations, purchase dates, vendor identification, anticipated life spans, wear and tear schedules, insurance coverage, location of and information regarding structure components or contents and similar information regarding furnishings and appurtenances of the structure.

Embodiments of this electronic model and data storage system can be accessible via a computer network and, more particularly, via a global information network such as the Internet. These embodiments can facilitate the exchange of information by allowing interested parties to remotely access the model and data storage for information regarding the structure, its elements or related information. For example, if an owner desires to replace carpet in specific rooms of the structure, the owner can inform eligible contractors of his desire and allow the contractors to access the electronic model of the structure for the purposes of measuring and estimating the cost of the replacement. Simultaneously, insurance adjustors and other interested parties can access identical information in the same way. Along with the physical attributes of the room, other pertinent information can be stored. In the case of carpet replacement, the quality, age and condition of the existing carpet can be stored so that contractors can estimate the needed quality or durability of a replacement. The structure owner may also store information specific to the estimate such as a desired life span for the replacement carpet, desired stain-resistance or other features. This same information can be stored for every feature of the structure and can be updated periodically to reflect a continuous history of structure maintenance and revision.

Maintenance requirements and information can also be stored in the system. These requirements may be stored in a static record or may be stored so as to activate prompts to the owner or designated others so that maintenance steps can be accomplished at recommended intervals. The system can be configured to automatically notify designated maintenance personnel to accomplish tasks at the recommended intervals or the owner can be prompted to arrange for the maintenance.

While data stored in embodiments of the present invention may be made accessible to anyone with network access, information access may be restricted completely from some areas or may be restricted to read-only access. Data entered into a data repository may originate from many parties. Home builders, contractors, insurance companies, appliance manufacturers and other parties may contribute data to the repository. At times this data may serve to document transactions or actions of the parties. Embodiments of the present invention have the ability to preserve and lock this information in a static condition so that parties can be assured that the information is accurate, unchanged and reliable.

Embodiments of the present invention also provide control access to items related to a structure so that selection of elements in the structure model or other areas of the repository allow a user to electronically control those items.

Accordingly, it is an object of some embodiments of the present invention to provide a system for storing and maintaining an electronic model of the physical attributes of a structure.

It is also an object of some embodiments of the present invention to provide a system for storing and maintaining information regarding a structure, its components, its contents and obligations and liabilities associated therewith.

Another object of some embodiments of the present invention is to provide a system for providing physical and non-physical information related to a structure to others via a computer network.

It is a further object of some embodiments of the present invention to provide remote control of items through manipulation of model or repository elements.

These and other objects and features of the present invention will become more fully apparent from the following, description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 111 is a diagram illustrating details of depreciation tables;

DETAILED DESCRIPTION OF THE PREFERRED EMBODIMENTS

Figure 1:
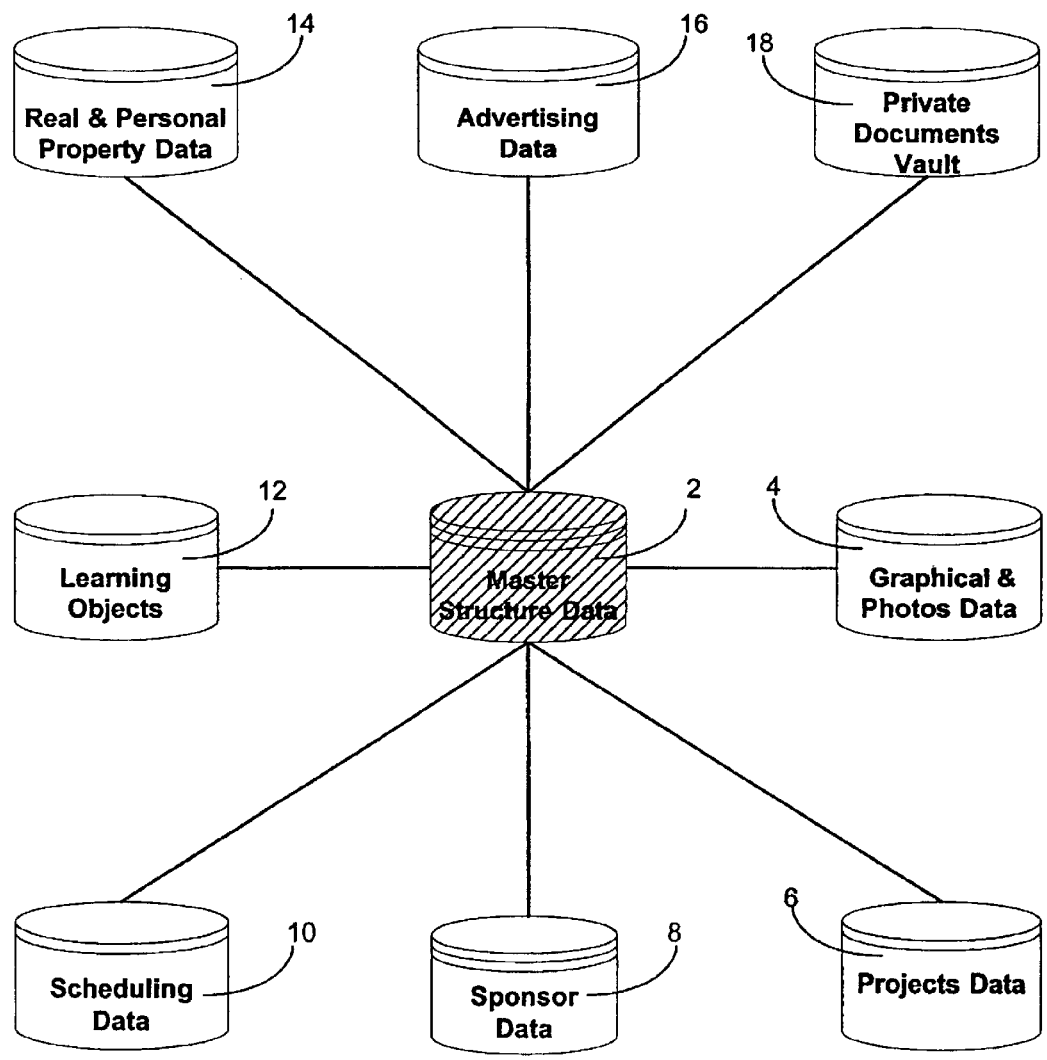
FIG. 1 is a diagram showing an exemplary master structure data.

The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the system and apparatus of the present invention, as represented in FIGS. 1 through 24, is not intended to limit the scope of the invention, as claimed, but it is merely representative of the presently preferred embodiments of the invention.

The currently preferred embodiments of the present invention will be best understood by reference to the drawings, wherein like parts are designated by like numerals throughout.

Embodiments of the present invention may be used for a variety of structures including, but not limited to, single-family residences, office buildings, commercial buildings, multi-family residential buildings, boats, vehicles and any other structure, vehicle or vessel. While embodiments of the present invention may be used in many applications, an embodiment for a single-family residence is thought to be illustrative of many of these embodiments and is used herein as a non-limiting example of some embodiments of the present invention.

Preferred embodiments of the present invention provide centralized access to structure information so that owners, insurers, contractors, maintenance personnel and other users may access an accurate and reliable repository of information which communicates relevant attributes of the structure, its components, its contents and the obligations and liabilities related thereto.

Embodiments of the present invention integrate the physical attributes of a structure with non-physical information relative to the structure's elements, owners, occupants, insurers, warrantors, builders, maintainers, furnishers, content providers and related parties or elements. This information is provided at a centralized network site so that all information pertinent to a structure or portion thereof can be accessed by others from a single site or source. Multiple parties may access this information repository so that several contractors, insurers or others may have simultaneous access to the information thereby speeding competitive bidding and other processes.

The data repository of embodiments of the present invention may be made accessible over the Internet to anyone with Internet access. However, structure owners and other users of preferred embodiments of the present invention may limit access to the repository to specific information or may make the repository completely private. A user may select certain areas to be public, select other areas to be accessible to a specific class of individuals, select another area to be accessible to another set of individuals and make some areas entirely exclusive. A user may also change the accessibility of certain areas to meet specific needs.

For example, and not by way of limitation, a user may wish to solicit bids on replacement of carpet or remodeling of a kitchen. The portion of the data repository which contains the structure model and the associated dimensional information may be made accessible to interested contractors or to the public in general during the bidding period. Contractors and materials suppliers may access the repository to determine quantities for their bids. By so doing, they alleviate the need to visit the site and measure the structure. When the bidding period is over, the owner may restrict access to the site.

As another non-limiting example, a structure owner may wish to receive recall and defect data regarding all appliances in their home. The owner may allow access to the portion of the repository which contains appliance data. Appliance manufacturers or other parties may access this portion of the database to determine what appliances are owned and contact the owner if any recalls have been issued or defects found. Those with limited access to dimensional data will not see personal property icons or other information which users with full access would see when viewing the model. Personal information is protected with the highest security measures.

Each portion of the repository may be secured with varying layers of protection. Passwords may be issued which are area specific or master passwords may be issued for complete access to the repository. Other security methods may also be employed.

Like access, repository modifications may also be restricted. Repository data may originate from a variety of sources. Home builders, contractors, appliance manufacturers, owners, insurance providers and other parties may contribute information to a repository. Some of this information may serve to document relationships between parties, transactions or other commitments or obligations. These documents must be preserved in an original condition to properly document the relationship. To preserve the originality of a document, a document may be designated as read-only by a contributing party or a group of parties so that those parties may rely upon a document's integrity. Other methods may also be used to preserve a document in a particular condition.

Specific parties may also contribute data to which they have unique modification rights. Only the contributing party or other designated parties may be allowed to modify the data. These modification rights are independent of access rights. A party may contribute data which may only be modified that contributing party or a select group of parties, but which may be accessed by any party.

As a non-limiting example, a contractor may contribute data to a repository comprising a model representing an addition to a structure along with estimates and a proposed contract. The contractor may restrict access to the data to himself, the structure owner and an insurance company. The contractor may also limit modification of the data to himself only. In this manner, the data will remain unchanged unless revised by the contractor. Subsequently, the owner may wish to change some aspects of the model, but will be denied modification rights unless they are allowed by the contractor. The contractor may change the modification rights and allow these changes by the owner after which he may update his estimate and contract. At this point the owner and insurance company may approve the model and contract and request that modification be locked to preserve the present state of the project and the contact documents. In this manner, the project documents will not be modified and a record of the party agreements will be preserved until all parties agree to make further modifications. In any case, this original locked document may be preserved and any further revisions may be reflected in a revised document separate from the locked original.

Access and modification rights may be related to the party who contributes the data, the owner of the structure, the party requesting the addition of data, the party sponsoring the data or the repository or other parties or combinations thereof.

In one non-limiting example, a contractor may make repairs on a structure and contribute data to the repository regarding those repairs. He may have modification and access rights to that particular data during the repair period. An owner may also grant access to other data to facilitate those repairs during the repair period and any preceding estimation period. Once the repairs are complete the owner and contractor may agree to lock the repair information and relinquish all modification rights. However, access rights may be maintained by both parties and extended to anyone.

Access rights, modification rights and contribution may be indicated through the use of icons in the structure model. Information displayed in the model such as the installer of an appliance may be indicated by an icon related to the appliance element in the model. The icon may display the name or trademark of the installer and may further take on a shape, color or other indicia to reflect access rights, modification rights or the data contributor.

In reference to FIG. 1, an embodiment of the present invention comprises master structure data 2 which comprises information relevant to a subject structure. Master structure data 2 will generally and preferably be stored on a computer system on a data storage device such as a hard drive, tape drive, CD or similar mass storage device. However, master storage data 2 may also be stored on other electronic storage devices such as in flash memory, RAM, or on other data storage devices. Master storage data 2 may assume almost any computer file format, but will preferably utilize a database configuration for information access. Master storage data 2 may be stored on a single storage device connected to a single computing device or may be segregated and stored on several computing devices with several storage devices. Data storage on a networked computer configuration is preferred, particularly with an Internet connection so that information may be accessed and uploaded from a wide variety of sites, however intranet and private network embodiments may also be used. An embodiment comprising a single computer system which provides direct dial-up, wireless or other access from other computers via a modem or another communications device may also be used. In networked embodiments of the present invention, master structure data 2 may be stored at several network locations and at multiple geographical locations on a network.

Figure 2:
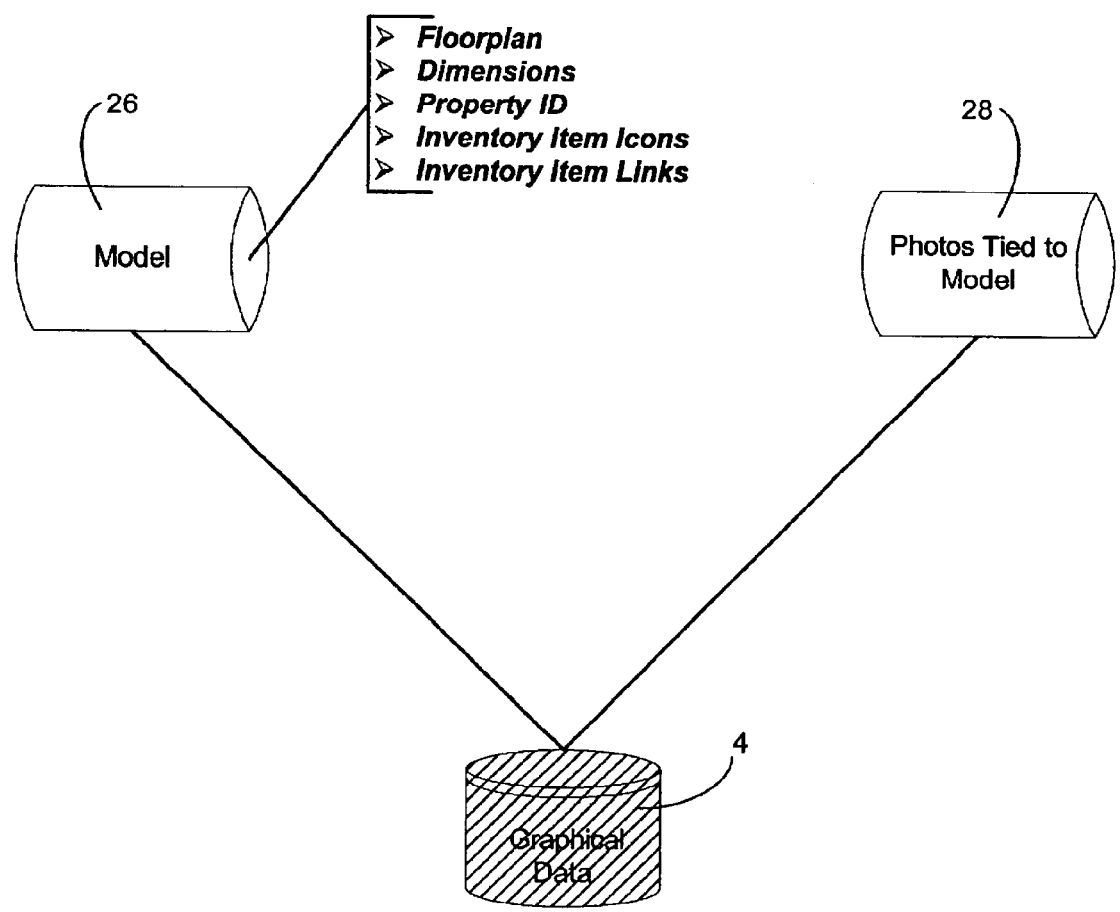
FIG. 2 is a diagram illustrating details of graphical data.

With further reference to FIG. 1 and FIG. 2, master structure data 2 will typically comprise graphical data 4 which may comprise 2- and 3-dimensional models of a structure and its appurtenances, digital images including photographs and other graphical data.

In a preferred embodiment of the present invention, graphical data 4 will typically comprise an electronic model of a structure which accurately portrays the physical attributes of the structure. Some embodiments incorporate a three-dimensional model which may comprise elements for walls, floors, ceilings, roofs, structural members, finished surfaces, floor coverings, windows, doors and other elements. These structural models may be created with numerous computer-aided design and drafting programs and imported into the repository of the present invention. Embodiments with two-dimensional models may use scanning and digital copying methods to import floor plans, details and other data. Other types of models may also be used. As a non-limiting example, two-dimensional models which reflect plan views of each floor of a building or other structure may be used as a model when three-dimension models are not available or are not practical. These models represent the physical dimensions and attributes of the structure and its various components.

Dimensions on which the models are based may be acquired from advanced GPS or satellite systems, by scanning blueprints, by digital photographs, by scanned photographs, by access to other databases, or be taken from as-built plans, direct physical measurement, or other physical measurement systems such as infrared or other electronic systems so that they accurately reflect the existing state of the structure. Records of past construction stages may also be retained for comparison purposes.

The models of embodiments of the present invention may also be used during construction of a structure to document construction progress. The sequence of construction of a new structure can be retained or forwarded to a financial institution or other party to verify progress before payment of an installment.

The physical model and its accurate dimensions allow contractors and others to compile estimates based on the dimensions reflected in the model thereby negating the need to perform an on-site visit. Availability of this model will allow non-local contractors and others from remote locations to competitively bid a project without incurring costs associated with site visits and independent measurements.

In reference to FIG. 2, the model 26 may be directly linked to digital images 28 which reflect current or past conditions of the structure. Images 28 of structure contents and components may also be linked to their location on the model. In a preferred embodiment of the present invention, a two- or three-dimensional model of a structure also contains elements that represent structure contents. These content elements are located where they typically reside in the structure. When a user views the model, the content elements are shown in the model, either as accurate depictions of the elements, as icons, as descriptive text or as some other depiction. A user may access an element image by clicking or otherwise selecting the depiction of that element which will bring the associated image to the display. In this manner the condition and appearance of structure contents and components may be documented.

Images may be tied or linked to various parts of a model. For example, each wall of a model may be linked to a digital photograph of that wall or each room may be linked to selected view of that room. As another non-limiting example, representations of windows in a model may be linked to an image of the view from that window. Other information links are discussed below in addition to linking of images.

Figure 3:
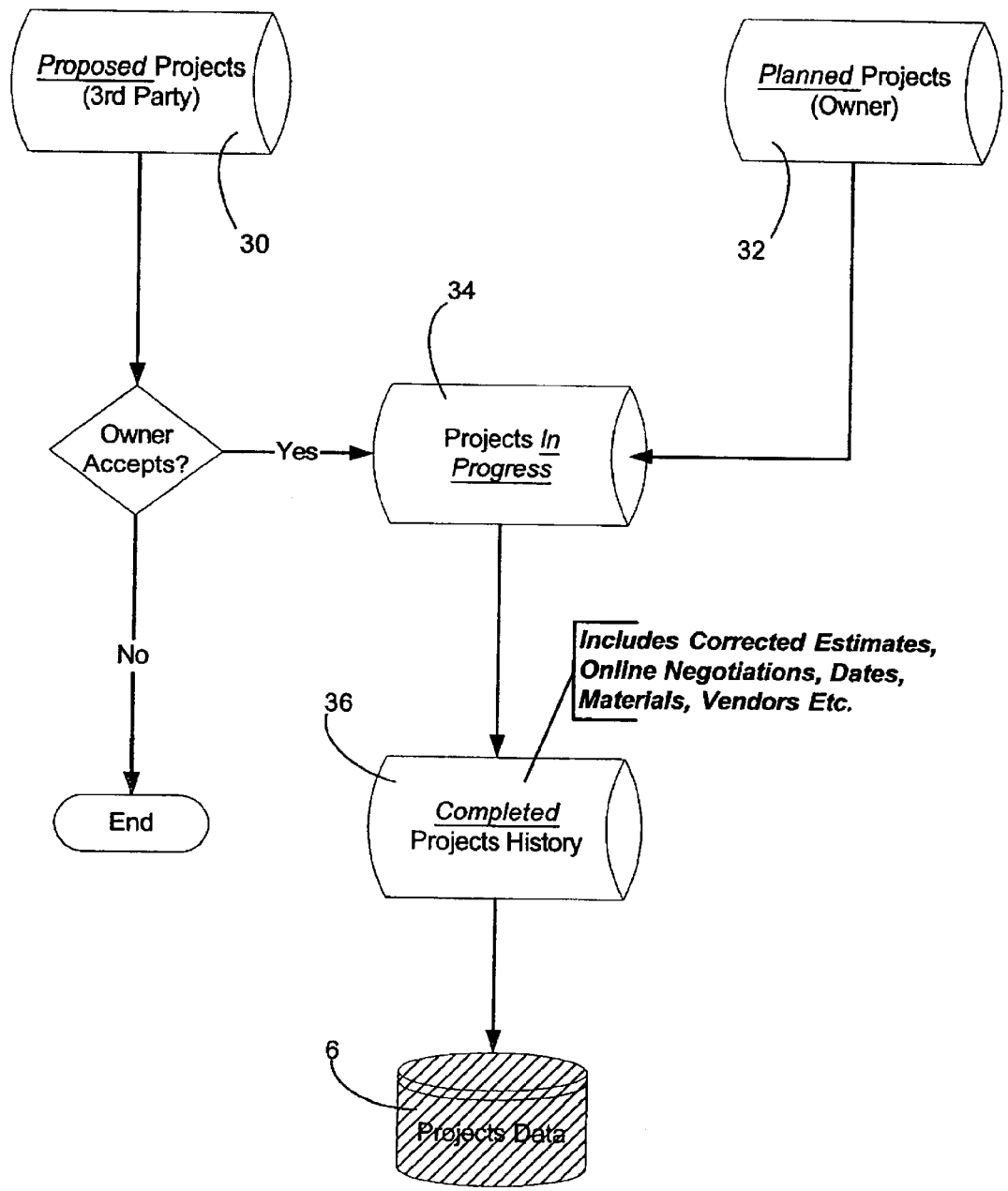
FIG. 3 is a diagram illustrating details of projects data.

In reference to FIGS. 1 & 3, master structure data 2 may also comprise project data 6. Project data 6 may comprise, without limitation, information related to proposed, completed and planned construction or modification projects related to the subject structure. Project data 6 may comprise proposed project information 30 which may include a two- or three-dimensional model of a proposed project associated with the subject structure. This proposed project structure will typically be similar to the structure model stored in graphical data 4 and may contain similar elements and image links. Proposed project data 30 may comprise data for several proposed projects which may be stored until an owner begins the project or cancels it.

Project data 6 may also comprise planned project data 32 for projects in the planning stages. These projects may be converted to proposed projects 30 or may be put in progress directly. In-progress projects 34 may be tracked and their information stored and updated as progress continues. When a project is completed it will be stored as a completed project 36 and information related to that project will be updated with corrected estimates, dates, materials, contractors, etc. Project data for any of these project types may comprise plans or other models, estimates, materials lists, specifications, bids, contractor contact data, material vendor data, progress dates and other information.

Figure 4:
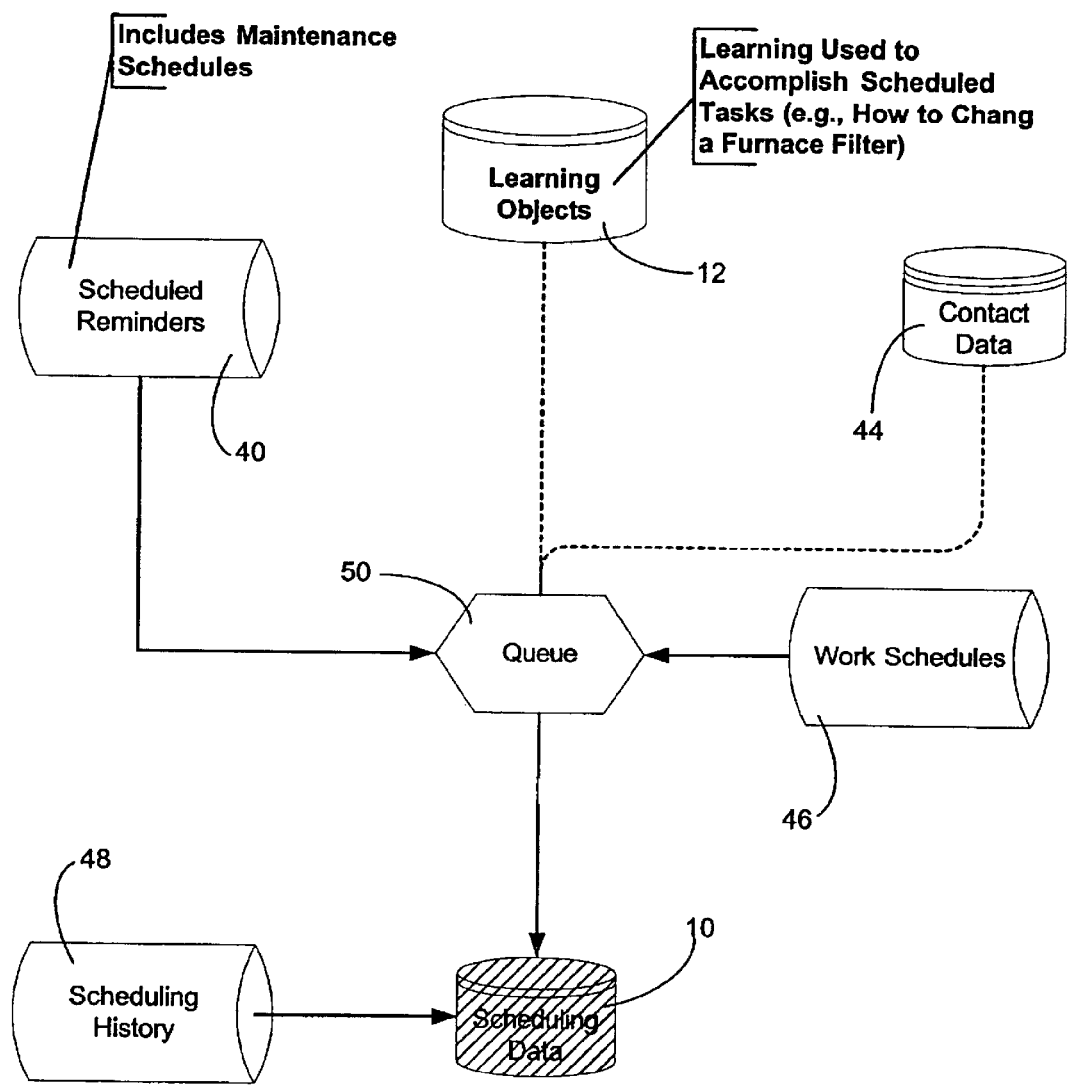
FIG. 4 is a diagram showing details of scheduling data.

In reference to FIGS. 1 & 4, scheduling data 10 may also be comprised within master structure data 2. Scheduling data 10 may comprise information related to scheduling of projects as well as scheduled reminders 40 including, without limitation, maintenance schedules, project construction schedules, warranty compliance schedules, other schedules and related information. Alerts may be sent out via a variety of communications media to make a user aware of scheduled events. Scheduling data 10 may also comprise information related to policy and warranty renewals and requirements as well as other information.

Contact data 44 may also be comprised within scheduling data 10 and may contain data related to contacting vendors, contractors, insurance agents and other parties associated with a structure or a particular project. Contact data 44 may also comprise contact method data related to preferred methods of contacting particular parties. As anon-limiting example, a contractor may prefer to be contacted by cell phone during working hours and by e-mail after hours. This contact information may be stored in contact data 44 for convenient and efficient communication with parties using automated messages or otherwise.

Preferred embodiments of the present invention also comprise learning objects 12 which may contribute data to scheduling data 10 and to other aspects of the present invention. Learning objects 12 may comprise computer and network-based training on subjects related to a structure, its components and contents. This training may include lessons, tutorials and other instruction on subjects dealing with structure maintenance, improvement, modification and methods and tools for achieving these goals. Using a residential building as a non-limiting example, learning objects 12 may comprise tutorials on how to remodel, repair plumbing, paint, install lighting, place concrete, install ceramic tile flooring or other jobs. Learning objects 12 may also comprise information relevant to having another party accomplish these tasks including, and not by way of limitation, how to engage a designer and contractor. Learning objects 12 may also comprise information regarding scheduling specific tasks. Preferred embodiments of learning objects 12 may also include links to scheduled reminders 40 such that a user may receive instruction on how to accomplish tasks associated with scheduled reminders 40 so that these tasks may be completed by a user, if desired, rather than assigned to a service provider.

Figure 5:
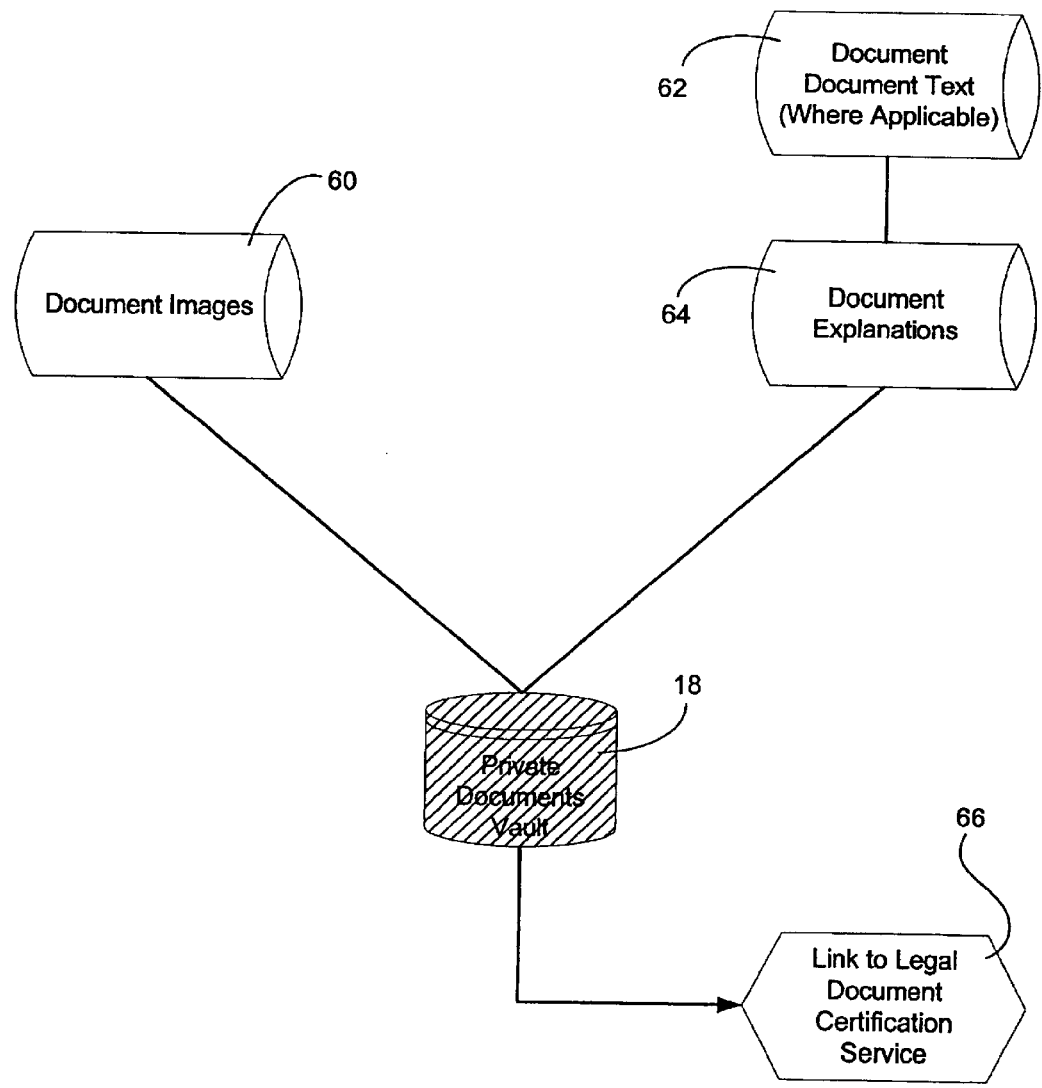
FIG. 5 is a diagram illustrating details of a private documents vault.

In reference to FIG. 5, private documents vault 18 is a portion of master structure data 2 which has enhanced security. Private Documents vault 18 comprises images and records of sensitive and important documents such as, but not limited to, deeds, wills, insurance policies, accounting records and financial data, bonds and other records and documents. These documents may be stored as electronic images 60 which may be created by scanning or other methods. These electronic images 60 may then be linked or otherwise associated with document text 62 which may include document titles and identification information which may be used for indices for sorting or filtering. Document explanations 64 may also be linked to document images 60 for ease in indexing and identification. Private documents vault 18 may also access legal document certification service 66. Legal document certification service 66 comprises a link between the data repository of embodiments of the present invention and a system for verifying the authenticity of the document images contained therein. Legal document certification service 66 may store an independent copy of an image stored in private documents vault 18 for comparison and verification purposes or may employ one or more of many document verification methods to verify document authenticity.

Other information related to the building is integrated with the physical model. The contents of a building including, but not limited to, furniture, artwork, fixtures, appliances and other items may be represented as physical representations in the model or they may be represented as textual information. Objects representing physical objects in the building may be shown in the model as a physical rendition of the object positioned in the correct location in the building model. Alternatively, these objects may be represented in a text index that is associated with the room in which they are located or some other associative model.

The details of warranties, insurance policies, maintenance records and requirements and other information may also be stored so that it can be accessed in relation to the location of the object related thereto. As a non-limiting example, a floor covering or appliance with a warranty is represented as an icon displayed in or adjacent to a room in the physical model. Selecting the associated floor or appliance icon accesses a file that contains the date the covering or appliance was installed, the term of the warranty, details of warranty coverage, conditions of the warranty, maintenance requirements, recommending cleaning methods, installer information and other related information.

The dates of purchase and the vendors from which components or contents have been purchased may also be recorded. Anticipated life spans, wear and tear schedules, insurance policy and warranty requirements may also be incorporated into the records of the present invention so that items may be properly valued and their replacement or repair scheduled and budgeted in advance.

Icons, list items or other elements related to appliances, equipment and fixtures may also provide an electronic link which provides control access to that item. Lights, thermostats, security systems and other items may be represented as an icon or other element of a structure model. Selecting that icon or element will activate a control menu which is linked to the selected item from which the item may be controlled, adjusted or otherwise manipulated. For example, and not by way of limitation, a structure owner might access her structure repository from work or any other location over the Internet and select the icon representing a security camera. By proper selection, the owner can then manipulate the camera and receive live video from the structure. Similar control functions may be achieved for other appliances and equipment such as furnaces, air conditioners, water valves, alarms and many other items.

Figure 6:
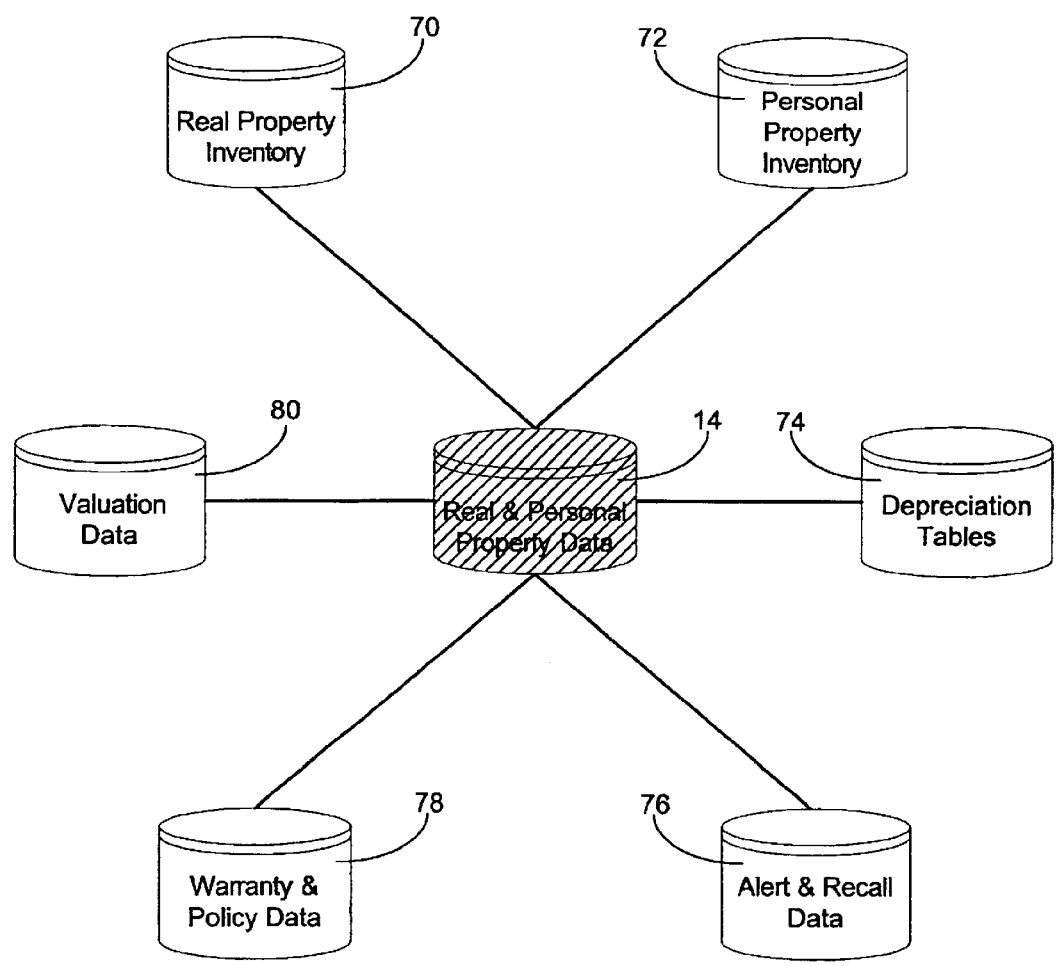
FIG. 6 is a diagram illustrating details of real and personal property data.

In reference to FIGS. 1 & 6, master structure data 2 may also comprise real and personal property data 14 which may contain, without limitation, information related to the real property associated with the subject structure and information related to the personal property contained in the subject structure and personal property related to or associated with the structure or its owner or resident. Generally, upon transfer of ownership or occupancy of the subject structure, personal property will remain with the prior owner and data associated with that personal property will be removed from the structure data repository for the subject structure. Real property will, generally, remain with the subject property and data associated therewith will continue to reside in the subject structure data repository. Accordingly, preferred embodiments of the present invention will keep personal and real property as separate records to facilitate data transfer and record updating upon transfer of ownership or occupancy.

Figure 7:
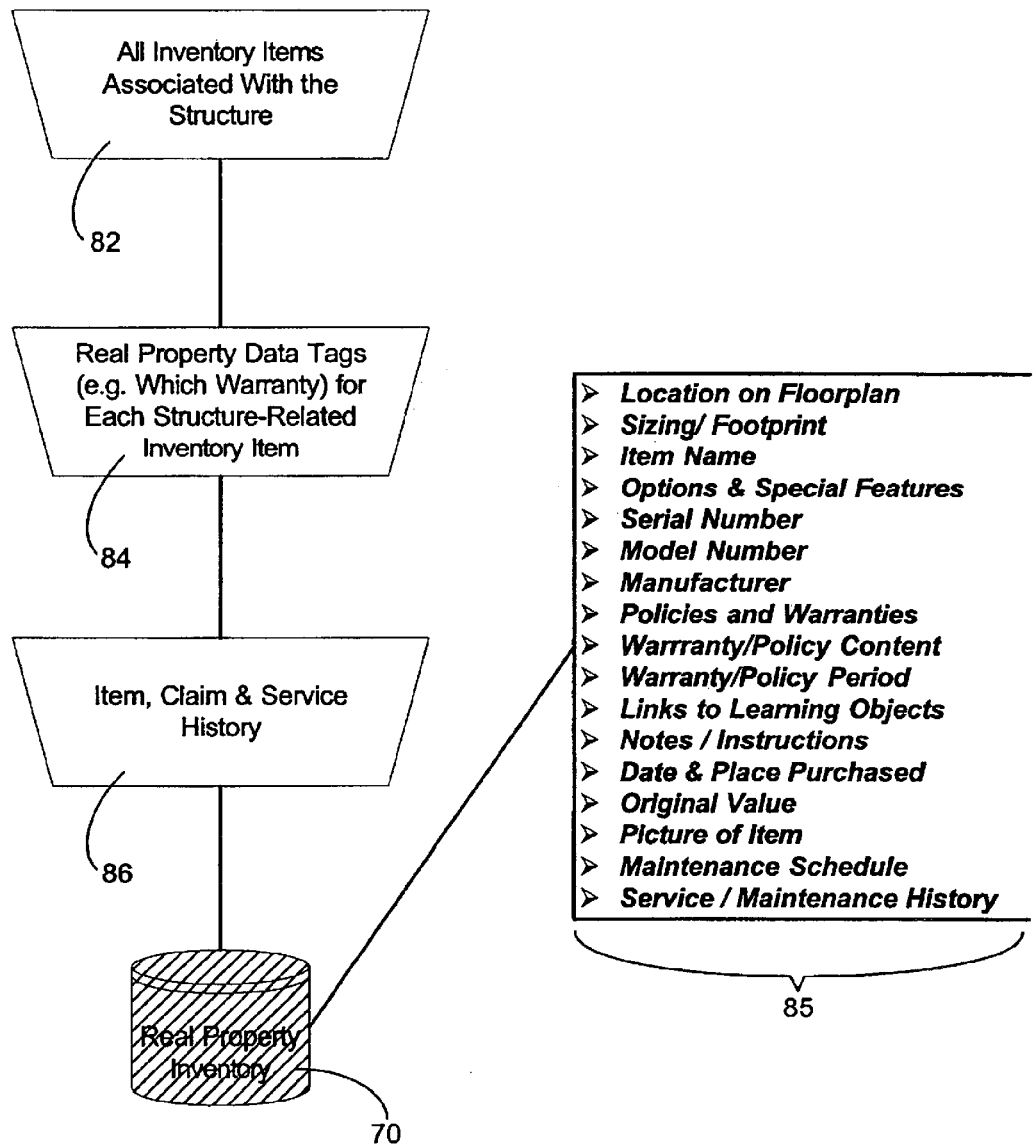
FIG. 7 is a diagram illustrating details of real property inventory.

In reference to FIG. 7, real property inventory 70 typically comprises inventory items 82 associated with the subject structure. Using a residential structure as a non-limiting example, real property inventory 70 may contain items 82 such as built-in appliances, fixtures, equipment such as furnaces and water heaters and other items directly related to the subject structure. Structure components such as windows, doors, siding and other elements may also be stored as real property inventory items 82. Each item 82 in real property inventory 70 may be linked to information relevant to that item. For example, and not by way of limitation, any real property item 82 may be linked to real property data 84 which may comprise warranty or insurance policy data for that specific item. Other information such as the installer, builder and/or manufacturer information may also be a part of real property data 84. Additionally, item, claim and service history data 86 may be linked to a real property item 82. Item claim and service history data 86 may comprise details of insurance and warranty claims which have been made in relation to an item 82. Maintenance and repair service performed on an item may also be stored as claim and service history data 86. Real property items 82 may be stored in real property inventory 70 using a real/personal property data structure 85 which contains data which identifies an item's location within a subject structure, the size or dimensions of the item, the item's name, features and options of the item, item serial and/or model number, the item manufacturer, policies and warranties related to the item, the content of relevant warranties and policies, the effective period of policies and warranties, links to learning objects related to the item, its use or maintenance, item purchase date, the vendor from which it was purchased, the original value of the item, an image depicting the item, a maintenance schedule for the item and the service or maintenance history of the item.

Figure 8:
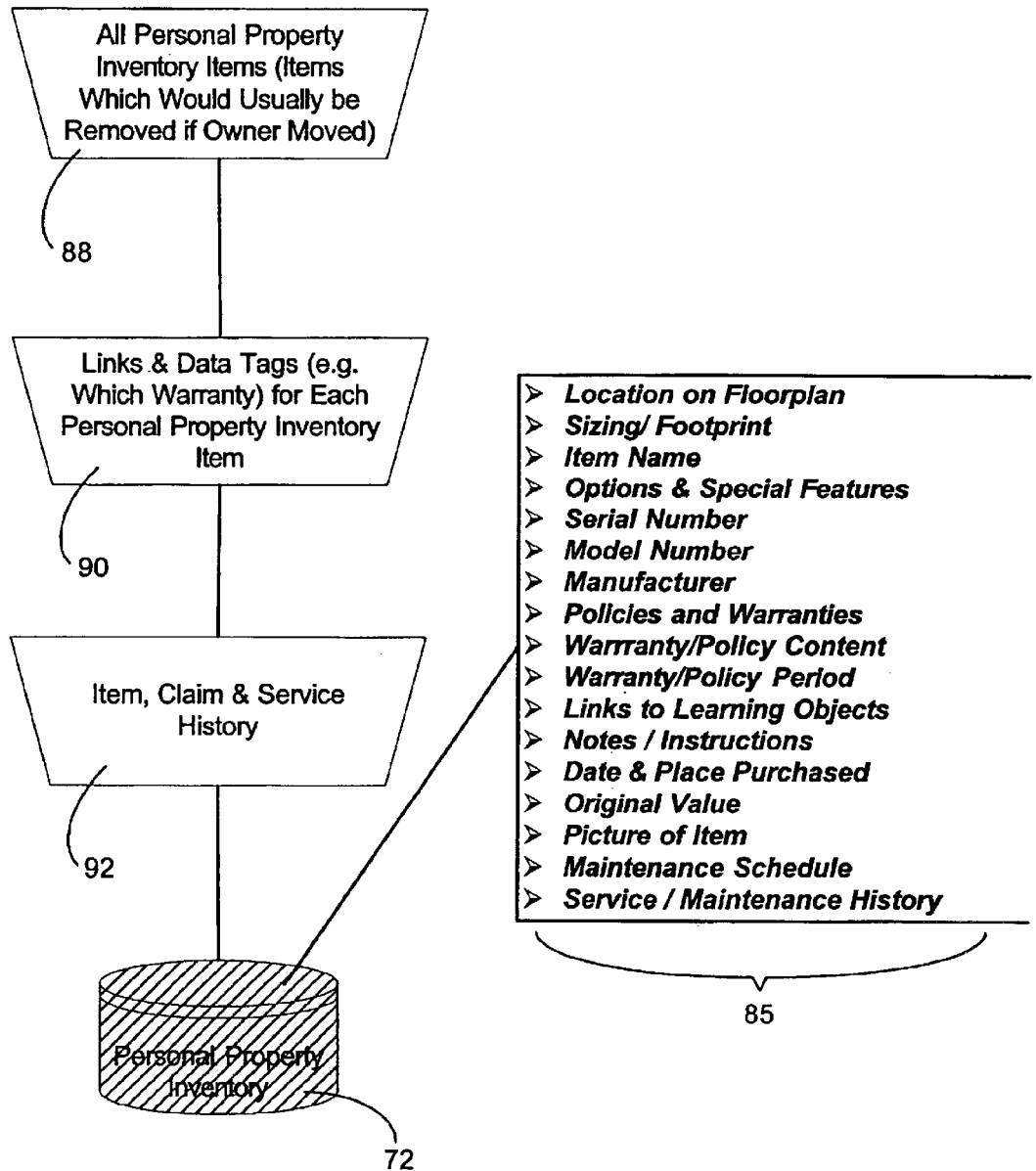
FIG. 8 is a diagram illustrating details of personal property inventory.

In reference to FIG. 8, a personal property inventory 72 similar to real property inventory 70 may be used to store personal property inventory items 88. A non-limiting example of personal property inventory items 88 is furniture, artwork, portable kitchen appliances and other items which are not likely to remain with the structure after a transfer of ownership or occupancy. Personal property inventory items 88 may also be linked to personal property data 90 which may also comprise warranty or insurance policy data for that specific personal property inventory item 88. Also, each personal property inventory item may be linked to a personal property item, claim and service history 92 which may comprise details of insurance and warranty claims which have been made in relation to a personal property inventory item 88. Personal property inventory items 88 may also be recorded using a real/personal property data structure 85 as described above.

Figure 9:
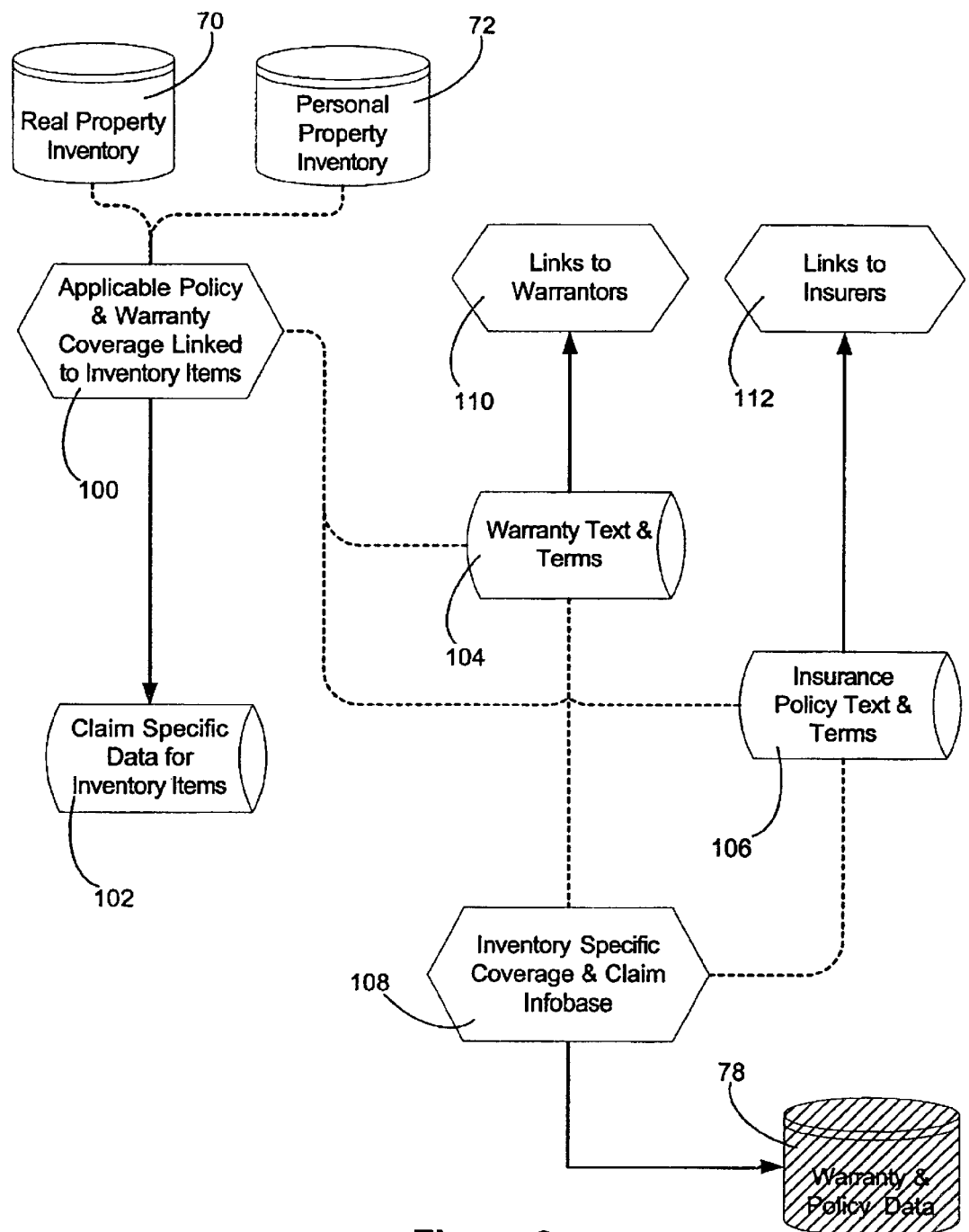
FIG. 9 is a diagram illustrating details of warranty and policy data.

In a preferred embodiment of the present invention, in reference to FIGS. 6 and 9, real and personal property data 14 may comprise warranty and policy data 78 which may contain warranty and policy information for each inventory item 82, 88 as well as the subject structure itself. Warranty and policy data 78 may be provided, augmented, maintained or otherwise manipulated or accessed through links to warrantors 110 or links to insurers 112. Through link 110 warranty information comprising text, terms and/or images 104 may be supplied and maintained by the linking party or the warranty information 104 may simply be accessed for review by the linking party through link 110. Insurance policy information 106 may be accessed and manipulated through a link to insurers 112 in a similar manner. This policy information 106 and warranty information 104 may be linked 100, 84, 90 to real and personal property inventory items 82, 88 and stored as claim specific data 102 when policy or warranty claims have been made on an item. Information 104, 106 may also be linked 100, 84, 90 to specific inventory items 82, 88 to form an inventory item specific coverage and claim site 108 from which item specific claim and coverage data may be accessed. This coverage and claim site 108 may be embodied in an intranet or Internet web page, an infobase, a database or some other data format which provides integrated information.

Figure 10:
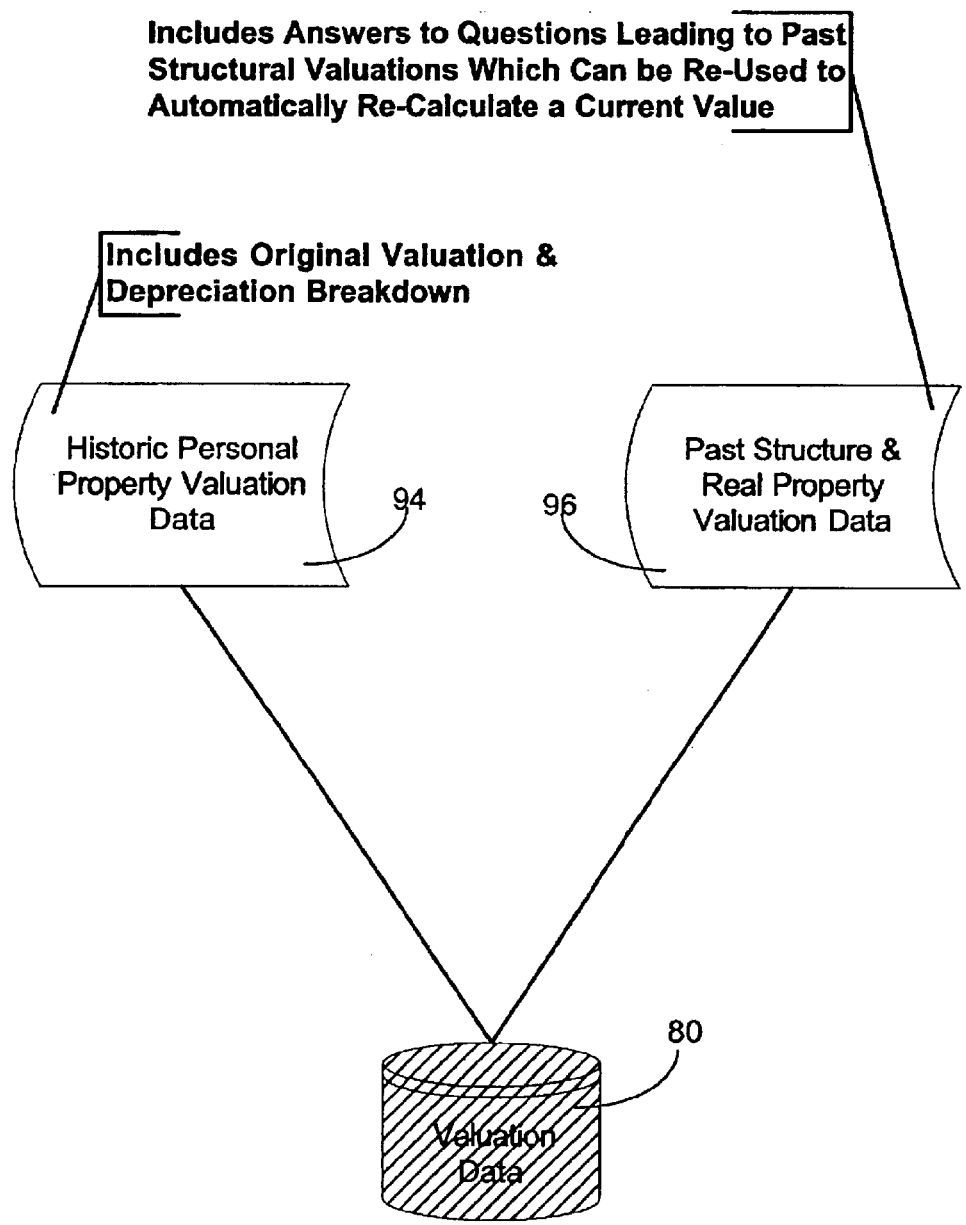
FIG. 10 is a diagram illustrating details of valuation data.

In reference to FIGS. 6 and 10, real and personal property data 14 may comprise valuation data 80 which comprises information relative to the past, present and future values of the subject structure and the real and personal property items in inventories 70, 72. Valuation data 80 may comprise past personal property valuation data 94 and past structure and real property valuation data 96. These property valuation data 94, 96 will preferably comprise the original valuation of each property item at the time of purchase as well as appreciation and/or depreciation data. Appraisal information may also be stored in valuation data 80. Item characteristics which affect valuation may also be stored and tracked in valuation data 80 so that updated appraisals and valuation statistics may be calculated or estimated. For example, and not by way of limitation, the number of bedrooms in a structure or the square footage of a structure may be tracked through several remodeling projects or potential projects so that valuation may be determined or estimated for project feasibility analysis, financing or other purposes.

Figure 11:
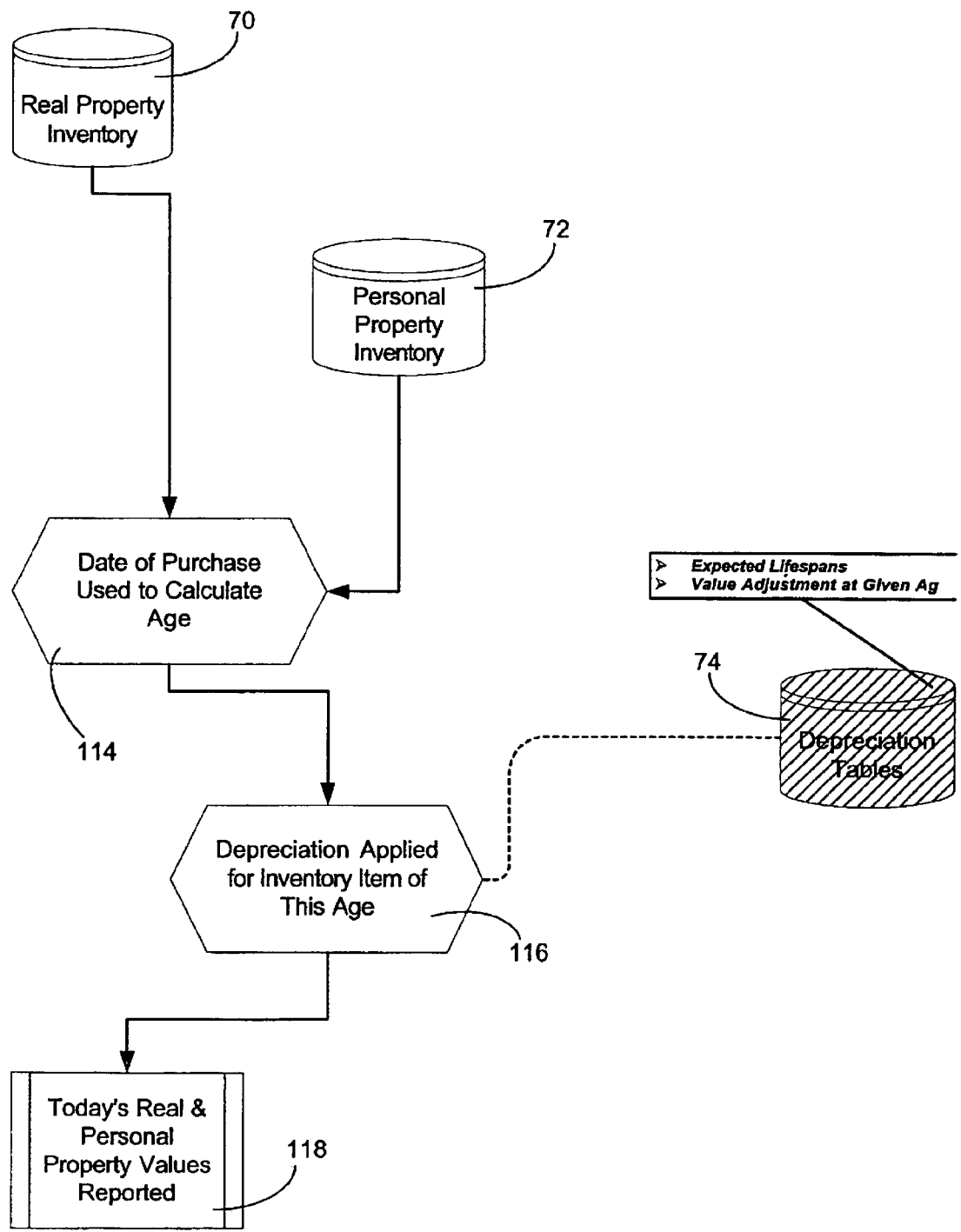

In reference to FIGS. 6 and 11, depreciation tables 74 may also be part of some embodiments of real and personal property data 14. Depreciation tables 74 may be used for items in real property inventory 70 and personal property inventory 72 as well as the subject structure. The date of purchase 114 may be stored and applied for each inventory item and for the subject structure. The original purchase price may be obtained from data recorded in property inventory data 70, 72. Using this information, depreciation table calculations 116 are applied to determine a present value 118 for an item or structure.

Some embodiments of the present invention also comprise automated functions which may alert the owner or others of important events regarding building maintenance and protection. For example, and not by way of limitation, conditions required for warranty coverage, insurance coverage or recommended maintenance procedures can be input into the system. The system of some embodiments of the present invention will notify the owner of the impending requirements so that they may be scheduled and accomplished. An owner or user may also designate a particular contractor or maintenance provider to accomplish an event and have the system automatically generate the necessary authorization to have a service provider accomplish the task. When each task is performed the record may be updated to reflect the new improvement or condition.

Figure 12:
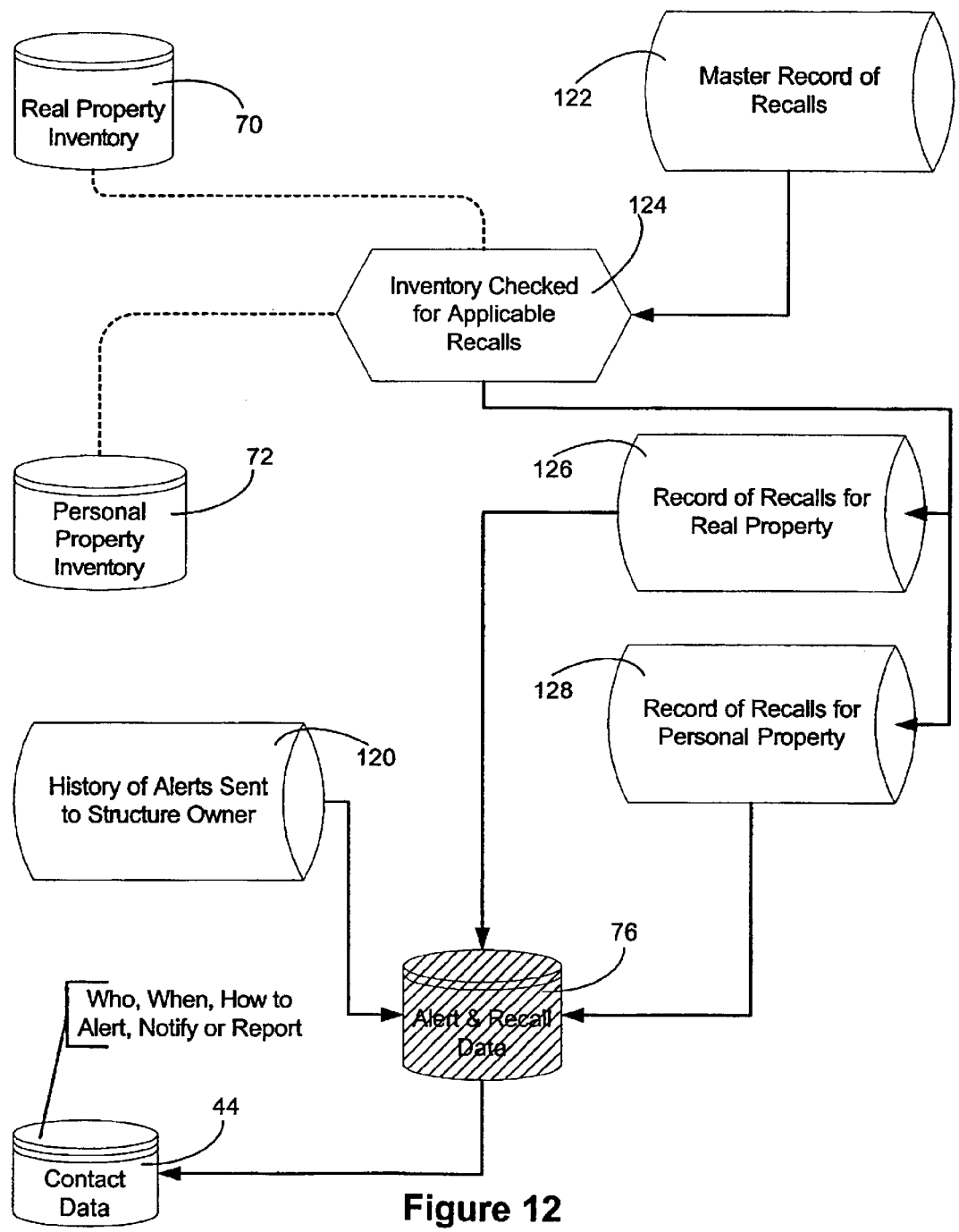
FIG. 12 is a diagram illustrating details of alert and recall data.

Real and personal property data 14 may also comprise alert and recall data 76, as shown in FIGS. 6 and 12. Alert and recall data 76 relates information that identifies specific inventory items in inventories 70 and 72 with a master record of recalls and notices 122. When recalls or other notices are found for specific items, they are recorded. For real property items, the recall or notice may be recorded in a record of recalls for real property 126. For personal property, the recall information may be recorded in a record of recalls for personal property 128. When a recall or notice is found for an item, contact data 44 is accessed to determine the appropriate method for contacting interested parties. With this information, an alert is communicated to subscribing parties to inform them of the recall or notice. Alerts may be sent to an owner, to designated service providers who may need to be involved to remedy the recall or to other parties. When an alert is communicated, a record of the alert is saved in alert history 120.

Figure 13:
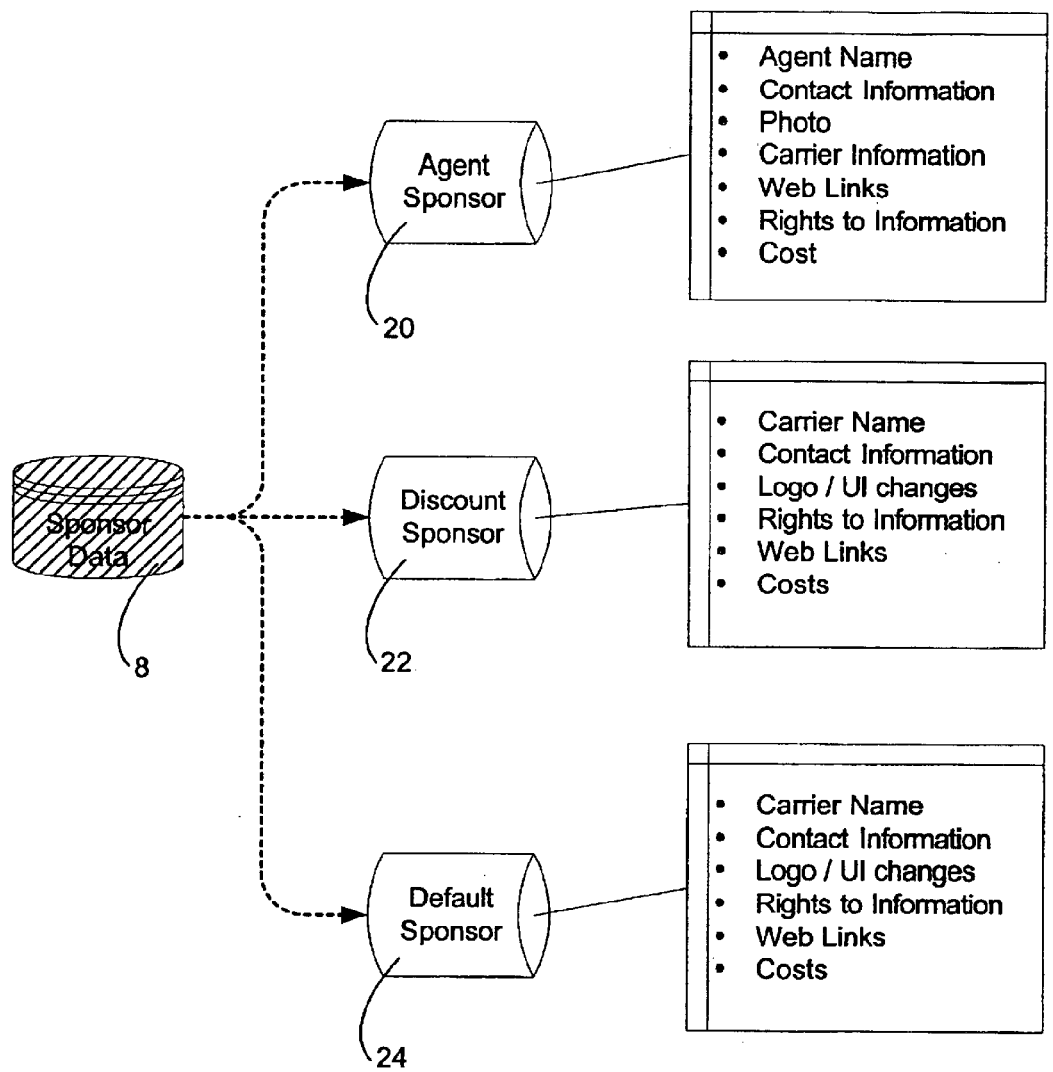
FIG. 13 is a diagram illustrating details of sponsor data.

With further reference to FIGS. 1 & 13, master structure data 2 may comprise sponsor data 8 which may comprise information regarding parties who may sponsor or subsidize the creation, maintenance or access to aspects of the present invention or related services or products. In some embodiments of the present invention, a party such as an insurance carrier or agent thereof may sponsor the use of the present invention in order to facilitate claims processing or for other reasons. When this is the case, agent sponsor data 20 will make up some part of sponsor data 8. Agent sponsor data 20 may comprise an agent's name, contact information, an agent photograph, company or carrier information, web links to agent related materials, information access rights and restrictions, cost data related to sponsorship of the subject structure and its data repository and other information relevant to an agent who may sponsor the data repository.

Sponsor data 8 may also comprise discount sponsor data 22. Discount sponsor data 22 may comprise information relevant to the identification of a sponsor who offers partial data repository sponsorship or who sponsors some aspects of repository creation, access or maintenance. For example, and not by way of limitation, discount sponsor data 22 may include the name, contact information and logo for an insurance carrier or internet access carrier who sponsors some aspect of the repository. Discount sponsor data 22 may also comprise web link data, access rights and restrictions and cost information related to a discount sponsor.

Sponsor data 8 may also comprise default sponsor data 24 which may comprise information related to a default sponsor for repositories covered by a specific insurance carrier, for repositories for certain types of structures, for repositories in specific geographic locations, for repositories for structures in flood damage or other hazard area of for repositories of some other kind. Default sponsor data 24 may be designated for any category of structure or structure owner in which a given sponsor may have interest. As an example, and not by way of limitation, a government agency such as FEMA may sponsor the creation and maintenance of data repositories in flood-prone areas as part of a damage recordation and mitigation effort. As another non-limiting example, an insurance carrier may sponsor the creation and maintenance of data repositories for all structures covered under their policies.

Any sponsor, whether it be an insurance company, government agency, contractor, building supply retailer or others, may act as a default sponsor 24, discount sponsor 22 or agent sponsor 20 depending upon the sponsor's relationship to the structure owner and the type of sponsorship provided.

Figure 14:
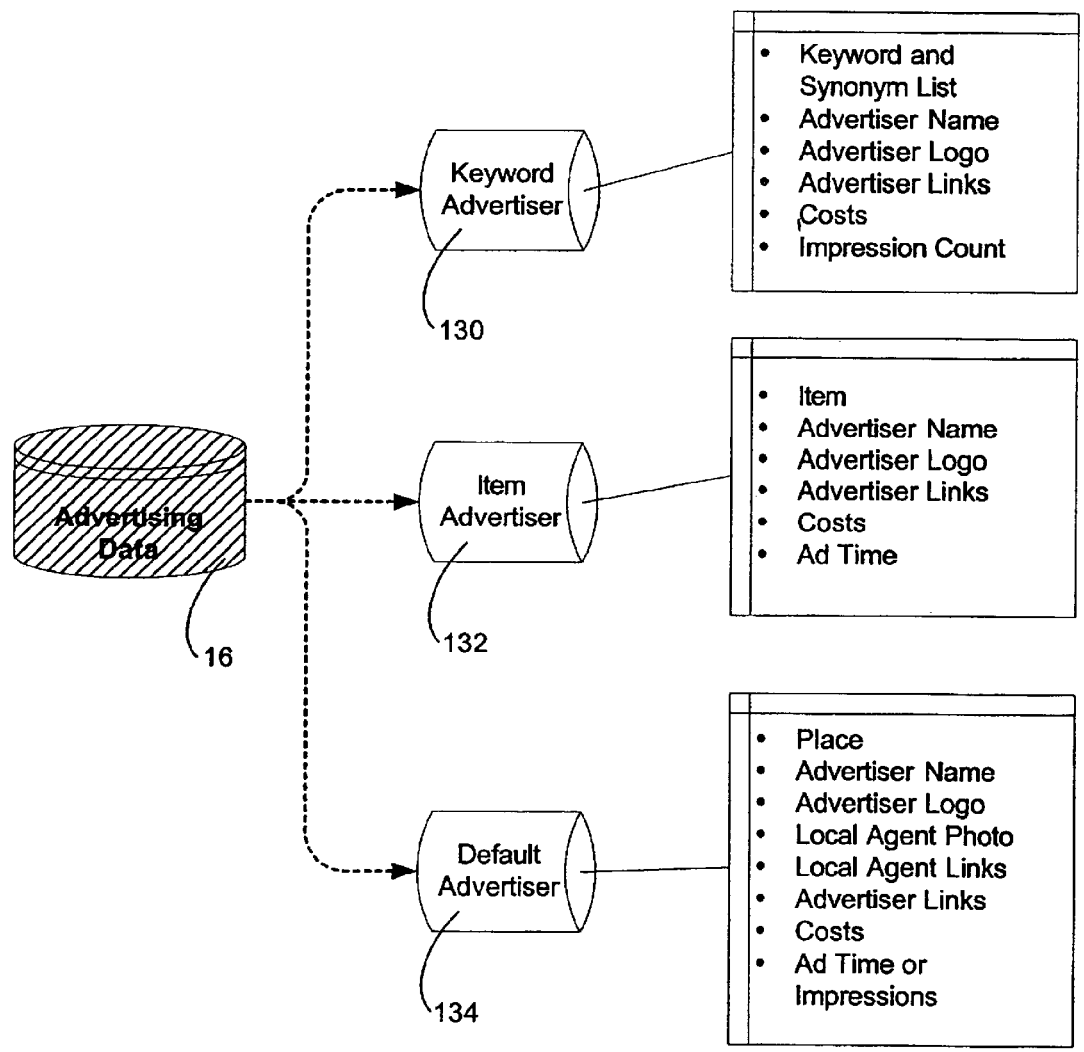
FIG. 14 is a diagram illustrating details of advertising data.

Master structure data 2 may also comprise advertising data 16 shown in FIGS. 1 and 14. Advertising data 16 will generally comprise information which identifies an advertiser and the goods and/or services he or they provide as well as actual advertising which may be displayed to users of the data repository of the present invention.

In some embodiments of the present invention, advertising data 16 may comprise information about keyword advertisers 130. Keyword advertisers 130 have advertising which is related to keywords in the data repository. Throughout the data repository, keywords may be linked, such as by hyperlink, to definitions or other explanatory material to help a user understand a word or process or otherwise increase user comprehension, efficiency or ease of use. As a non-limiting example, keyword advertisers 130, may have their advertising linked to these keywords such that it is displayed when a user selects a keyword link. In this manner a keyword advertiser, such as a cabinet maker, may direct his advertising to those who seek keyword information about kitchen or bath remodeling. Keyword advertiser information 130 may comprise a keyword and synonym list, the advertiser name and contact information, the advertiser logo, links to an advertiser website, costs and an impression count or hit count to monitor advertisement activity.

Advertising data 16 may, in some embodiments, also comprise item advertiser information 132 for advertisers who have advertisements linked to specific items in the repository. These items may be inventory items such as those in real property inventory 70 and personal property inventory 72 or other items and elements such as structure elements displayed in model 26 or elsewhere. These advertisements may be linked to items when they are displayed as text in a list or individually or they may be linked to graphical elements shown on a visual display which may be selected by a user using a pointing device such as a mouse. As a non-limiting example, a personal property item 88, such as a vase, may be displayed as an image of a vase in a room displayed as part of graphical model 26. When a user selects the image of the vase, the user may be linked to information related to the vase such as insurance policy data and valuation data. The user may also be linked to an advertisement for insurance, a security system or some other product or service when the item is selected. A text display of the item may be similarly linked. The advertisement may also be combined with the item information such as by framing or some other combined display. In some embodiments of the present invention, item advertiser information 132 may comprise the item to which the advertising is linked, the advertiser name and contact information, an advertiser logo or graphic display, links to on-line advertiser resources such as a website, costs, times when ads are displayed, etc.

Advertising data 16 may also comprise default advertiser information 134. A default advertiser may have advertising which is linked to items, keywords, specific repository areas or pages or other aspects of the repository. A default advertiser will generally pay for advertising which is linked to items, keywords or other elements or areas which have not been designated or chosen by a primary item or keyword advertiser. Similar to other advertiser information, default advertiser information 134 may comprise advertiser location information, an advertiser name and contact information, a logo or graphic information, photographs of company representatives, links to Internet or intranet advertiser sites, links to representative's sites, costs and ad time or impressions.

The above detailed description focusing on the structure of preferred embodiments of the present invention may be augmented by the following description which reveals more detail of the processes and methods of embodiments of the present invention.

Figure 15:
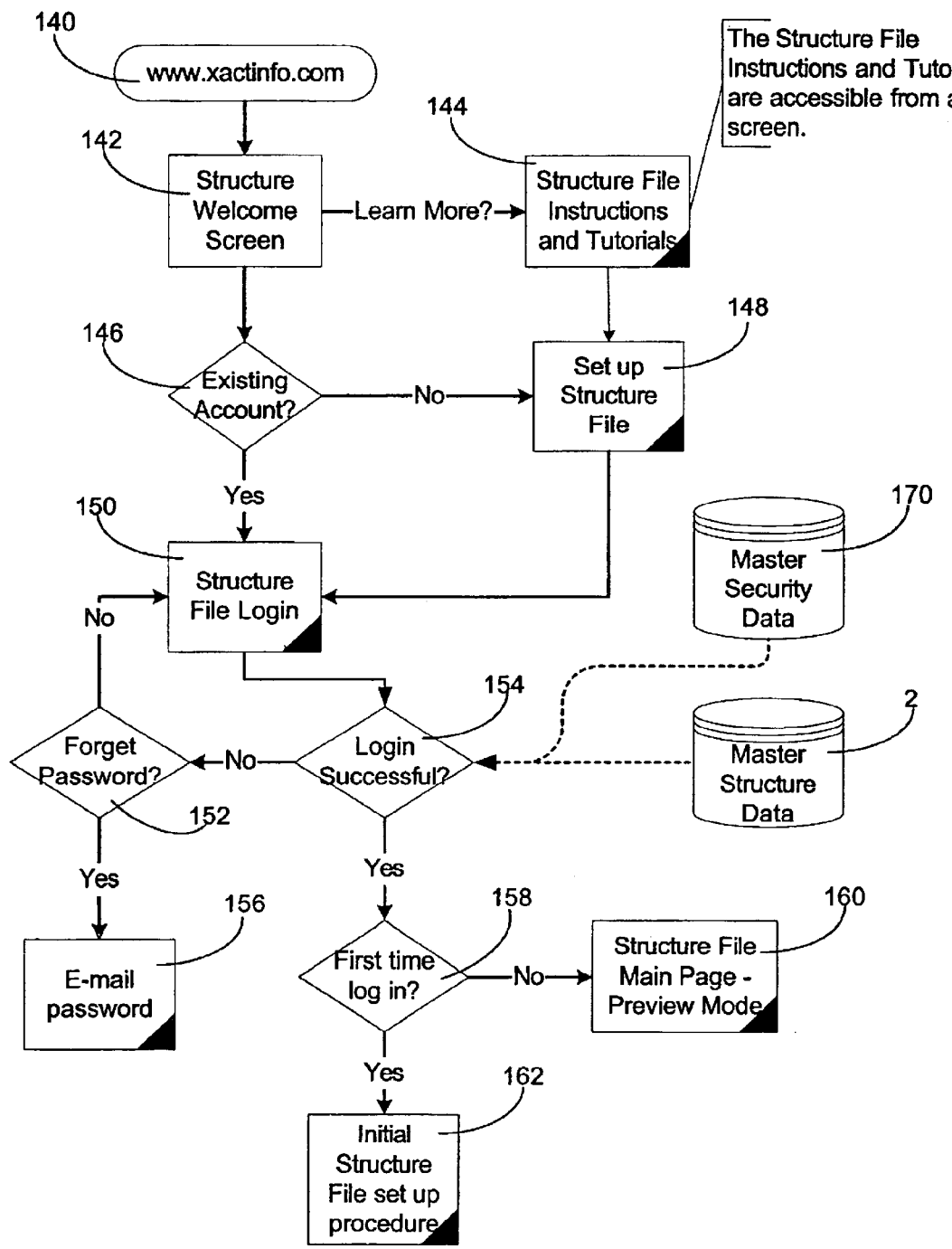
FIG. 15 is a diagram illustrating details of structure file setup.

In a preferred embodiment of the present invention, as shown in FIG. 15, a user establishes a repository by accessing web page 140 and indicating a desire to set up a structure data repository. Other embodiments of the present invention may employ other access and information gathering methods such as direct dial-up modem connections, formatted data file downloads and many other methods to set up and maintain a data repository.

When a user initiates repository set up, a structure welcome screen 142 is displayed which gives the user an option to proceed with an existing account 146 or to receive structure file instructions and tutorials 144. Structure file instructions and tutorials 144 may comprise text-based, graphical and multi-media presentations for educating a new user in the methods, syntax, vocabulary and procedures of embodiments of the present invention. Structure file instructions and tutorials 144 may comprise information regarding file set up, navigation of the systems of the present invention, data repository requirements and other information relevant to the use and maintenance of a structure data repository. Marketing information and pricing may also be included in some embodiments. Structure file instructions and tutorials may also provide access to learning objects 12 to educate a user on maintenance, modification, use and protection of various structures.

Figure 16:
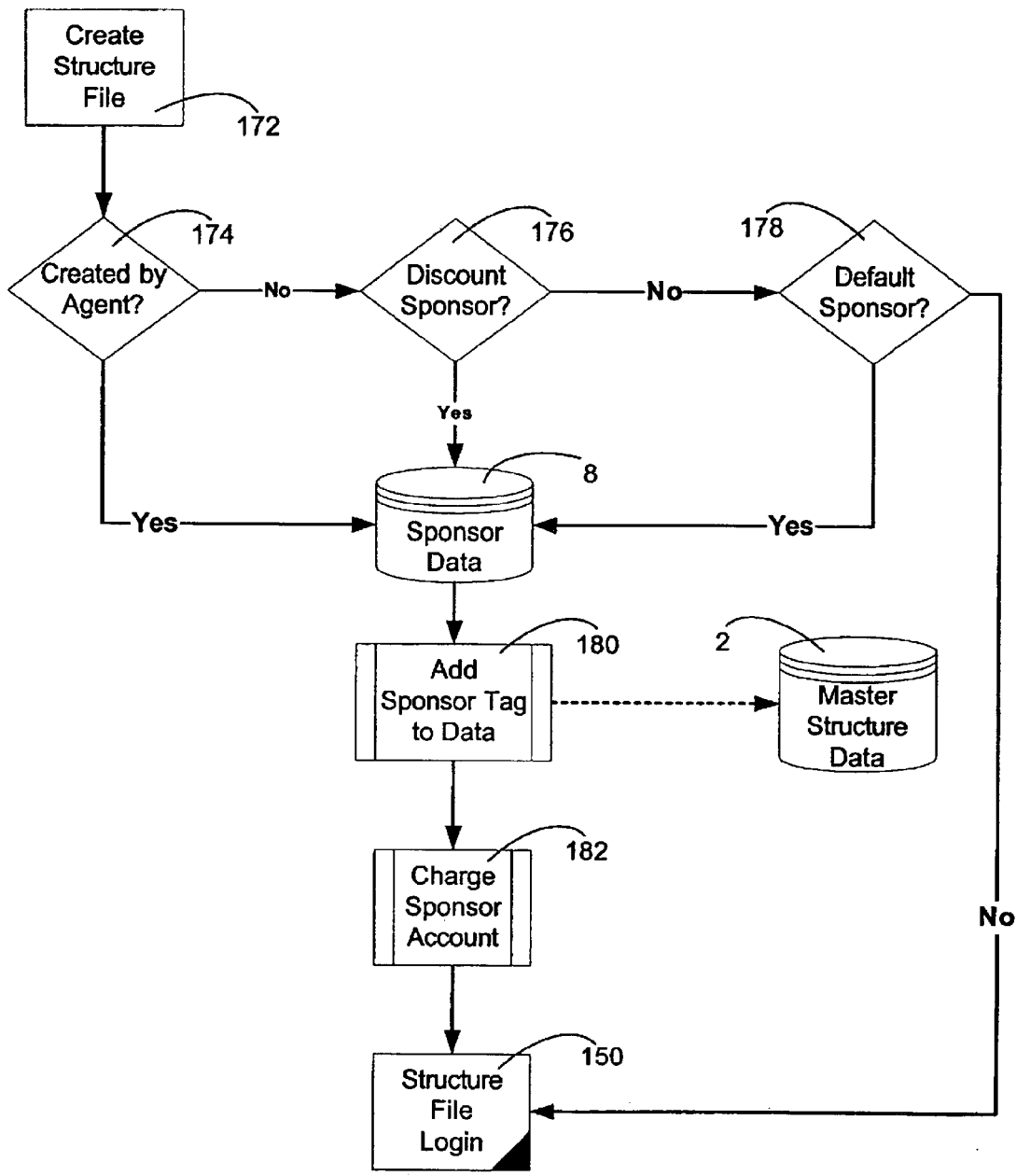
FIG. 16 is a diagram illustrating details of structure file creation.

After a user has accessed structure file instructions and tutorials 144, the user may proceed directly to structure file set up 148. A user may also bypass instructions and tutorials 144 and access structure file set up 148 without instructions. When structure file set up 148 is accessed, as shown in FIG. 16, a create structure file sequence 172 is commenced. A series of prompts may be displayed to the user to determine sponsorship. An agent 174 may create and sponsor the repository or a discount sponsor 176 or default sponsor 178 may be the sponsor. If any of these sponsorship options are selected, the appropriate sponsorship information will be recorded in sponsor data 8. The repository data will be tagged 180 so that master structure data 2 will be linked to the sponsor. The sponsor will then be charged 182 for the repository set up and initialization fees. After sponsorship has been indicated and charged, a user will proceed to structure file log-in 150. Alternatively, if no sponsor is indicated, a user may skip the sponsorship identification steps and access the structure file log-in 150 directly.

The structure file log-in screen 150 will generally prompt a user to input a name and password to prevent unauthorized entry into the system. Other security measures may also be taken when additional security is desired. If a user forgets a password 152, the user may obtain a new password or have the present password e-mailed 156 to a pre-established user address after proper identification and verification procedures.

During log-in procedures, data is retrieved from master security data 170 and master structure data 2 for identification and verification. When log-in is successful 154, a first-time log-in status is determined 158. This may be accomplished by an automated procedure or by simple prompt to the user. When a user logs in for the first time, the user will be directed to an initial structure file setup procedure 162. This file set up procedure 162, shown in FIG. 17, comprises a welcome screen 190 which leads to an administrative information set up procedure 192 which is followed by an option for further help 194 in setting up a structure file. When help is desired, a structure file set up wizard 198 is accessed.

Figure 17:
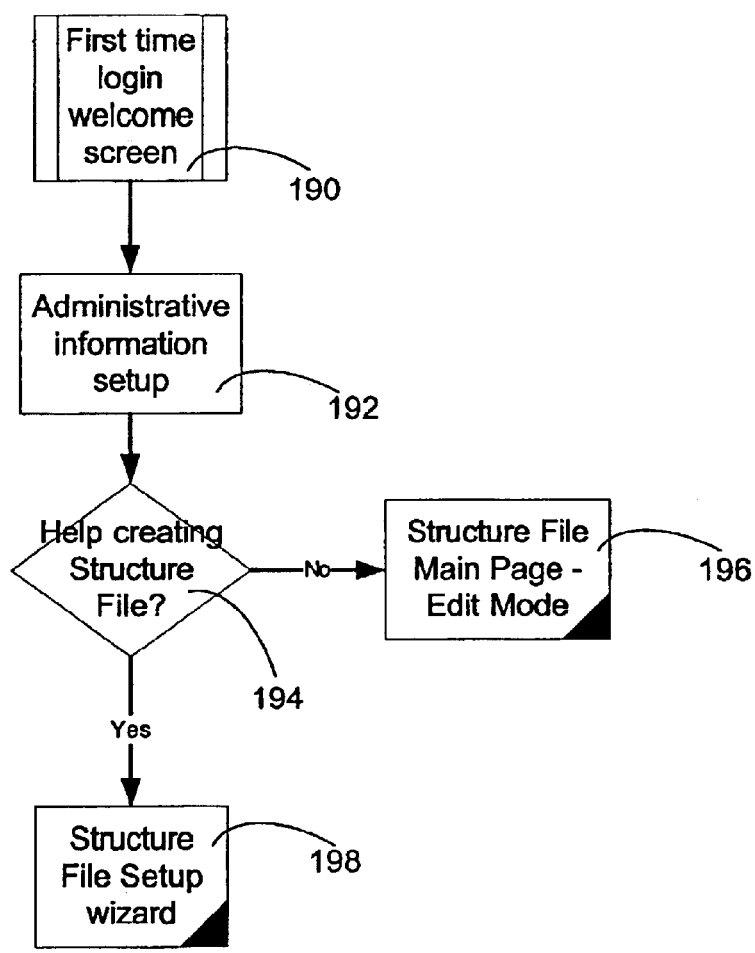
FIG. 17 is a diagram illustrating details of a login procedure.
Figure 18:
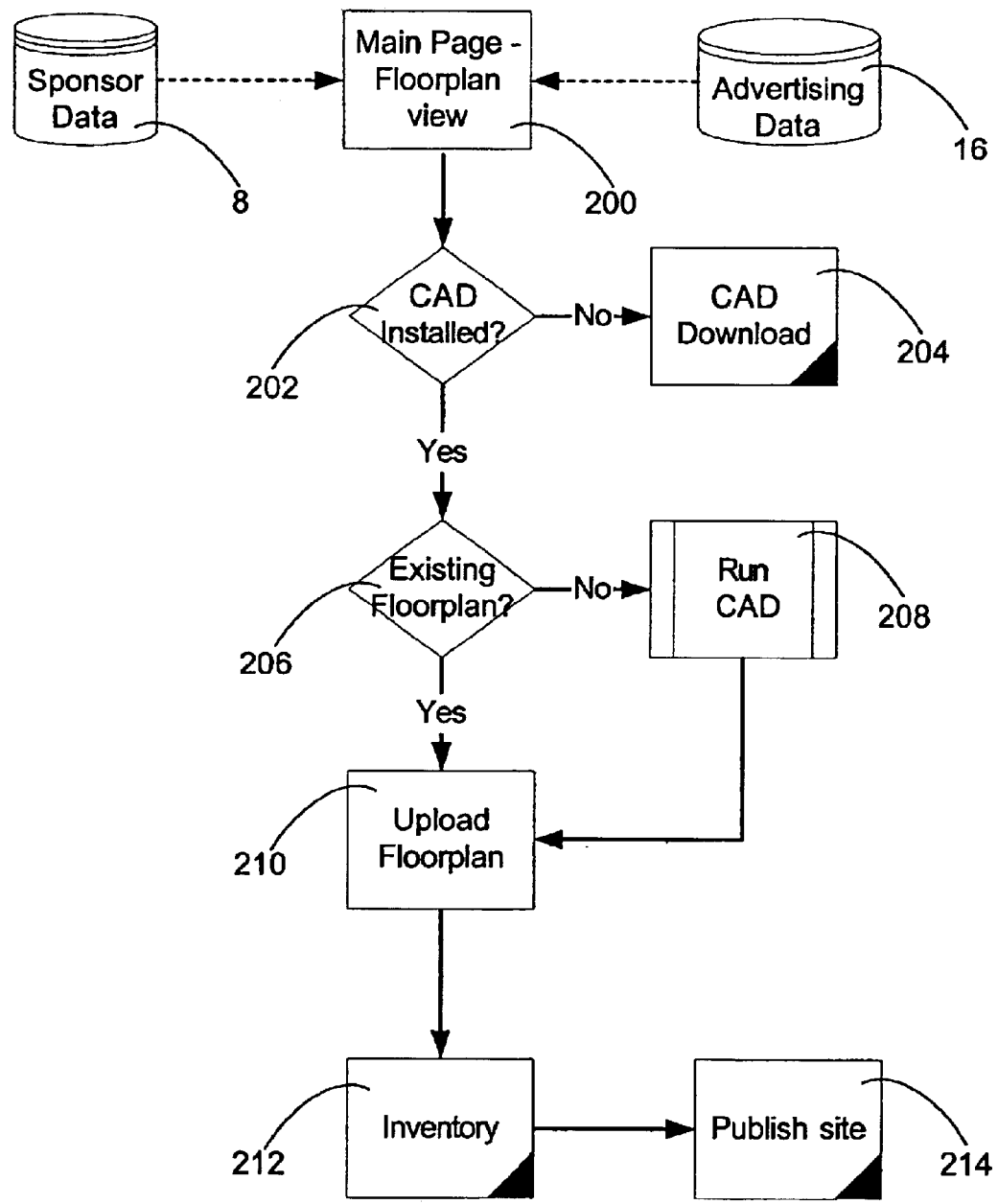
FIG. 18 is a diagram illustrating details of model creation and setup.

The structure file set up wizard 198, shown in FIGS. 17 and 18, may retrieve information from sponsor data 8 and advertising data 16 to customize the information and displays of the set up wizard. This help file begins with the main page of the structure file which, in this example of a residential structure, will generally be a floor plan view of the residence. If the floor plan has not yet been entered the view will be blank. In some embodiments of the present invention, a computer-aided drafting (CAD) program may be used to input structure plan information. A CAD program may be made available from the repository system proprietor and distributed to users. When a user does not have a compatible CAD program or prepared CAD file 202, the user may download a CAD program 204 directly from the systems of the present invention. The CAD program may then be used to access an existing CAD floor plan file 206 or the CAD program may be used to create 208 a floor plan file or other model file. When a user is not familiar with the operation of a CAD program, a professional designer may be employed to create an appropriate file. Once the floor plan file has been created, it is uploaded 210 to the repository for storage and access through the systems of the present invention. The file will also be augmented with additional information as the set up procedure continues.

Figure 19:
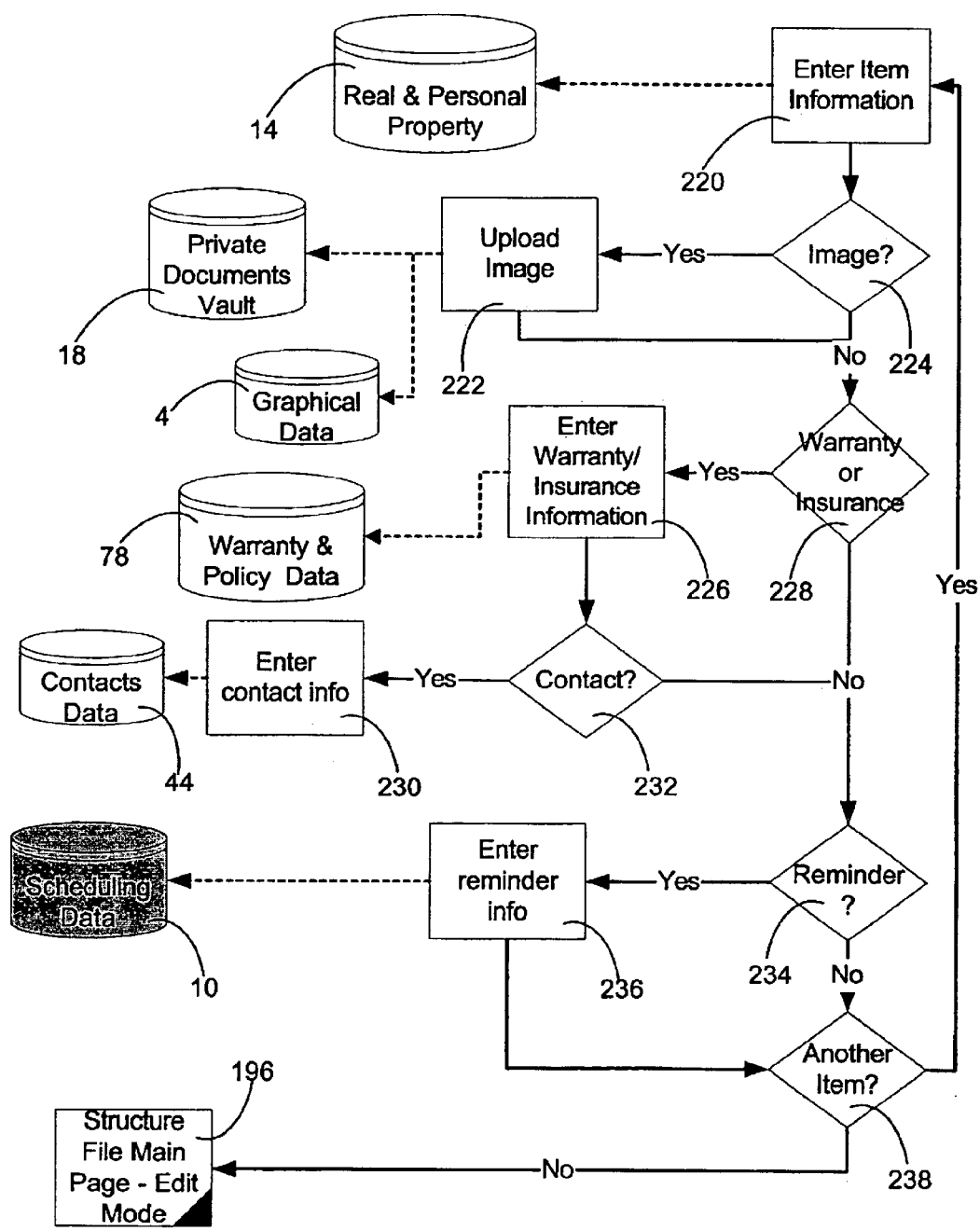
FIG. 19 is a diagram illustrating details of inventory item input.

Inventory information 212 may be added to the structure file, as shown in FIG. 19. Inventory items are input to the system 220 and stored according to the item type and information type. Information may be stored as real and personal property data 14 as well as other types of data and other formats. When inventory data is received in graphical form 224, such as scanned documents or photographs, the files are uploaded 222 and stored according to their document type. Private documents are stored in the private documents vault 18 under enhanced security. Images, such as photographs of the structure, are stored with graphical data 4 and linked to the appropriate portions of the structure model. Warranty or insurance data 228 may be entered 226 and stored with warranty and policy data 78. Contact data 232 is entered 230 and stored with other contact information as contact data 44. Reminder information 234 may also be entered 236 and stored with scheduling data 10. When all items are entered, a user is directed to the structure file main page 196 where major aspects of the repository are available for editing.

Figure 20:
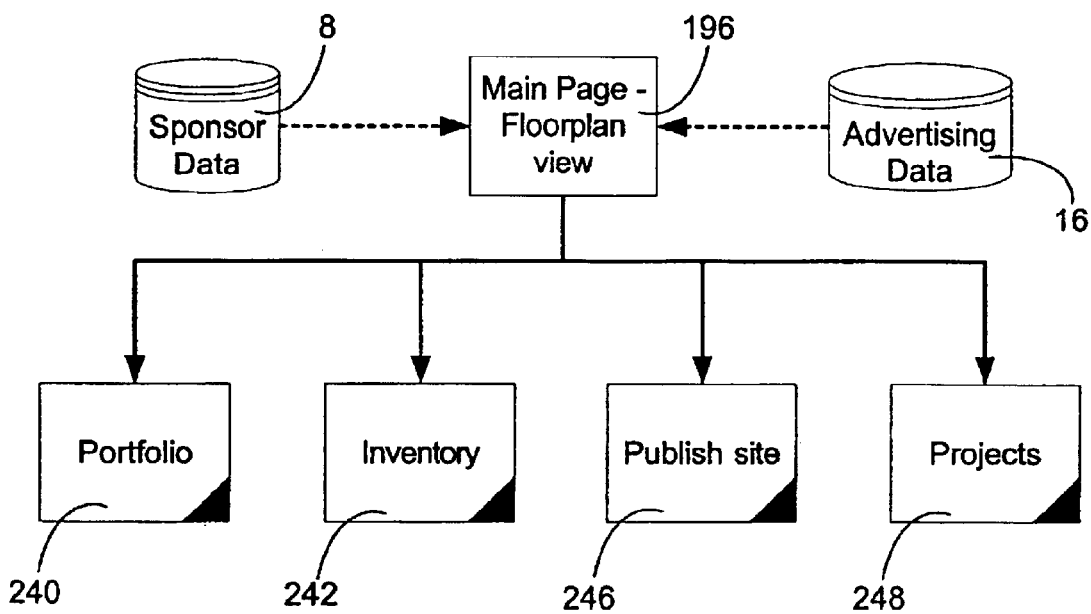
FIG. 20 is a diagram illustrating details of a structure file main page menu.

Structure file main page 196, as shown in FIG. 20 is displayed with data retrieved from sponsor data 8 and advertising data 16 and offers access and editing options for a user portfolio 240, inventories 242, site publication 246 and projects 248.

Figure 21:
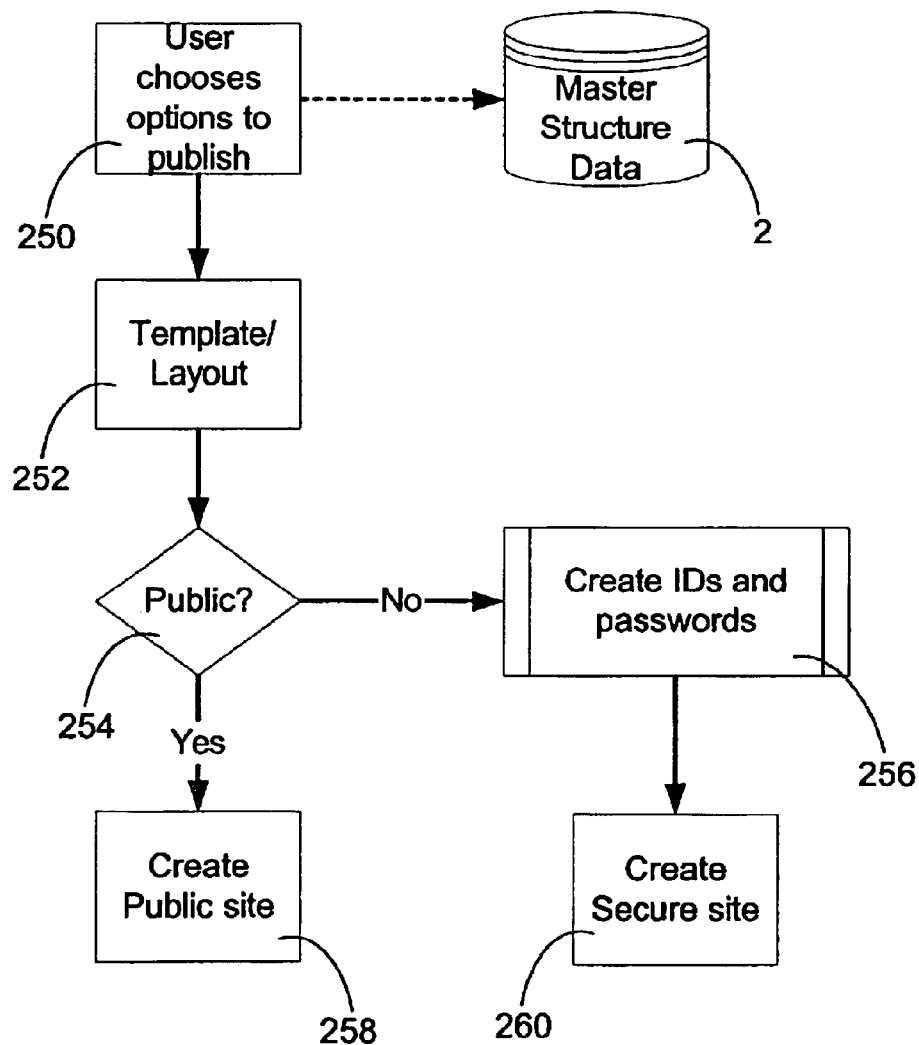
FIG. 21 is a diagram illustrating details of site publication.

When a user has created a structure file and added inventory and other information to the repository, the repository may be compiled into a site and published for access, as shown in FIG. 21. From the structure file main page 196, a user may choose to publish a site. When this option is selected, a user is prompted to choose from publication options 250 and master structure data 2 is accessed. Template and layout options 252 are then selected. If the site is to be available for general public access 254, the site is published and made available to all network or Internet users. When privacy or selected access are desired, a user may create an access protocol with user D's and passwords 256 or other security, encryption or access limitation measures. A secure site is then published 260 for access by selected individuals.

A user may take advantage of the information in a structure repository by creating projects which add to or modify the structure. Using the example of a residential structure, a user may create a remodeling project based on changes to the model of the subject structure. Additions and interior renovations may be specified in a project. A project may also be defined as replacement of an appliance, furnace or water heater which exists in the repository. Interested parties with access to the published site may gather information from the data repository or communicate their interest, bids and availability information to a site owner.

Figure 22:
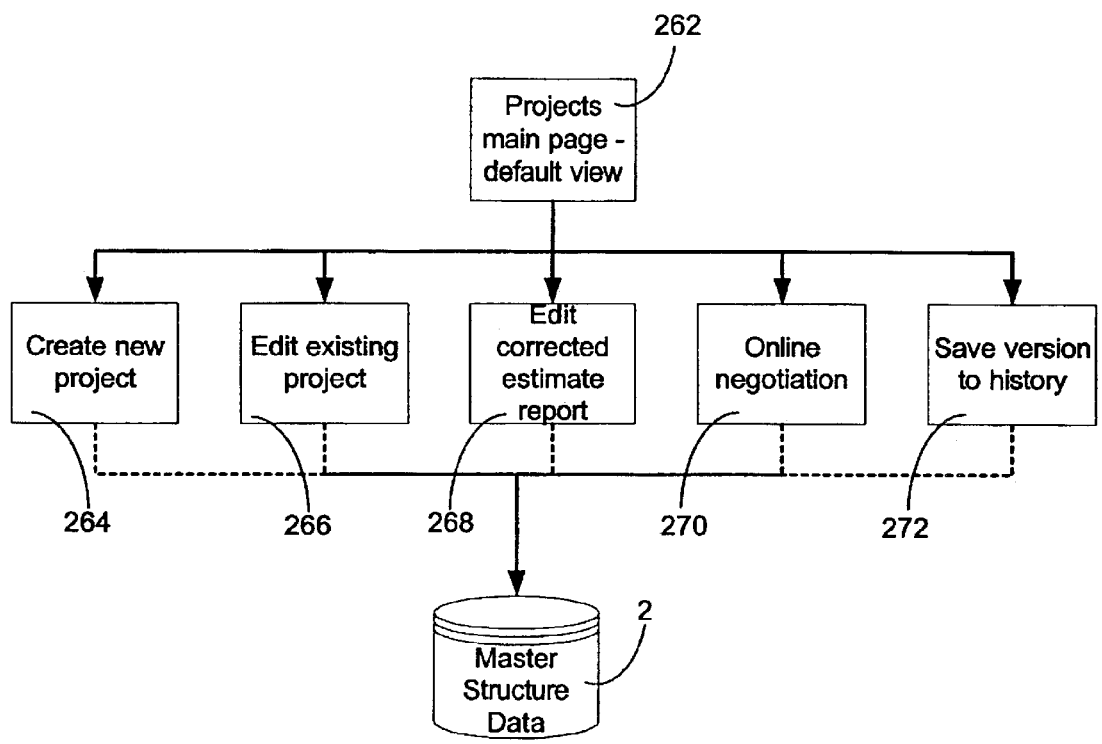
FIG. 22 is a diagram illustrating details of a projects page main menu.

In reference to FIGS. 20 and 22, a user may select the project menu 248 from the structure file main page 196 to access a project main page 262. The project main page offers options to create a new project 264, edit an existing project 266, edit an estimate report 268, negotiate on-line 270 or save a project version to a history file 272. When these options are selected, any additional information is saved to master structure data 2.

A user may create a new project 264 by adding to the structure model through the use of a CAD program and identifying the additional model space and associated information as a new project. Projects may also be defined by selection of inventory items, such as carpet in specific rooms of the model, a kitchen applicance, exterior paint or masonry repairs.

Once a project has been defined, it may be edited 266 in order to bring the project into budget constraints, to reflect changing user preferences or for any other reason.

When a project has been published and made available for access by interested contractors, merchants or other providers of goods or services, the repository owner may receive estimates from these parties. These estimates may be edited and corrected 268 as necessary to reflect project changes and estimate negotiation. On-line negotiation 270 may also take place as the repository owner and interested service or product providers communicate through on-line chat sessions, video conferencing or other communications.

Project versions may be archived or saved 272 for reference or review as needs and desires change.

Users of embodiments of the present invention may create portfolios to manage and organize multiple repositories. Parties such as developers, contractors and others may create portfolios to organize a large quantity of repositories for quick access to data from each repository. A developer or contractor may create a repository for each house in a subdivision and place the repositories in a portfolio for that subdivision. Scheduling and other data may then be accessed and updated more efficiently.

Figure 23:
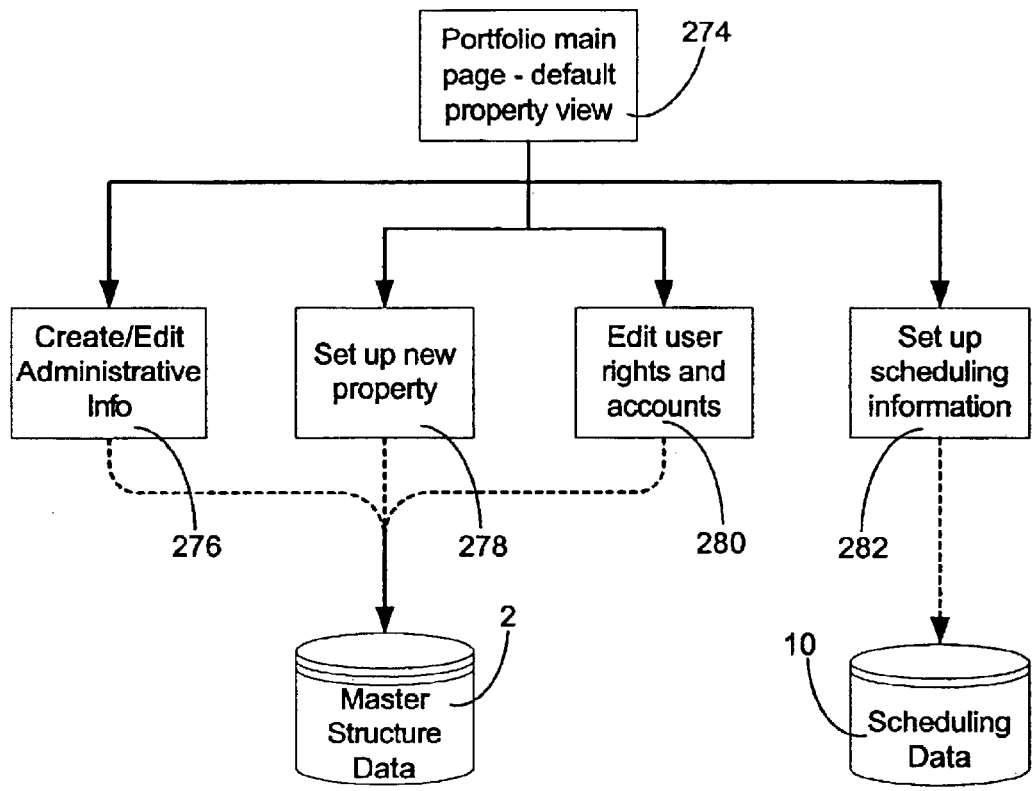
FIG. 23 is a diagram illustrating details of a portfolio main page menu.

In reference to FIGS. 20 and 23, portfolios may also be created to organize multiple repositories owned or managed by a single entity. The portfolio option 240 may be selected from the structure file main page 196 which leads to portfolio main page 274, shown on FIG. 23. From this portfolio menu, a user may create or edit administrative information 276 associated with one or more repositories. The portfolio menu also allows a user to set up a repository for a new property 278. User access rights and account information may also be accessed and modified 280. This information is stored in master structure data 2 for each structure involved. Scheduling information may also be accessed and manipulated 282 from portfolio menu 274 and stored in scheduling data 10.

Figure 24:
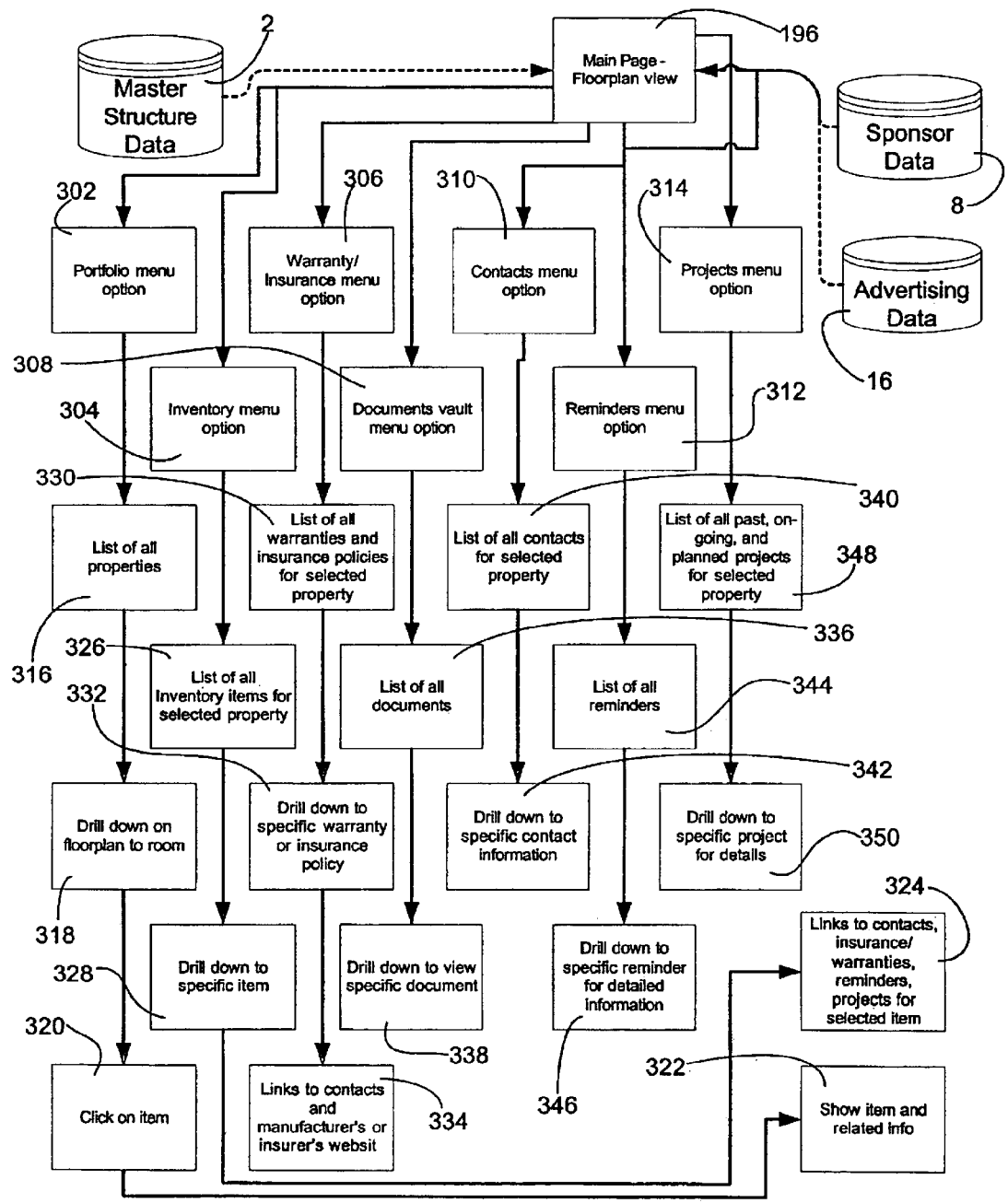
FIG. 24 is a diagram illustrating details of a main page menu.

An experienced user may navigate directly to structure file main page 160 and bypass the structure file set up procedure 162, as shown in FIG. 15. When this is done a user will be presented with a preview mode of structure file main menu 196, as illustrated in FIG. 24. This display is produced with information retrieved from master structure data 2 as well as sponsor data 8 and advertising data 16. Generally, a floor plan view of a structure will be displayed and a variety of menu options will be available.

One menu option is the portfolio menu 302 which allows access to a list of properties 316 as well as room specific information 318 accessed by selecting a room on the structure model. Once the room has been selected, items within the room may be selected 320 to display a more detailed depiction of the item 322 which has been stored by embodiments of the present invention. These depictions may vary from simple icons to detailed digital photographs or accurate three-dimensional models. Item selection may also provide access to contact information, insurance and warranty information, reminder, projects and other information 324.

An inventory menu option 304 is also available which will provide access to a list of all inventory items 326 for the subject structure. Further selection of items in these lists 328 will allow access to more detailed depictions 322 and information 324.

A warranty and insurance menu option 306 will allow access to a list of all recorded warranties and insurance policies 330 for the subject structure and its components and contents as well as its owner or occupants. Further selection in this menu structure will allow a user to access specific policy and warranty data for specific items 332. This information may be stored as scanned images of the actual policies and warranties or may be a computer-readable text-based version of the documents. Links to on-line resources of warrantors and insurance providers may also be accessed 334 by menu selection.

Structure file main page 196 may also comprise a document vault menu option 308 which provides a list of all documents 336 retained in private documents vault 18. Specific documents contained therein may be viewed by selection thereof 338.

Contacts menu option 310 provides access to a list of all contacts for a selected structure or property 340. Specific information about each contact may be accessed by making the appropriate selection 342 from the list 340.

A reminders menu 312 also allows access to reminders stored in the system in list form 344. Selection of specific listed reminders allows viewing and editing of reminders 346.

A projects menu option 314 may also be selected from structure file main page 196 which allows access to a list of all past, proposed, planned and in-progress projects 348 related to the subject structure. Information for specific projects may be accessed by selection of a project 350.

Embodiments of the present invention may utilize computerized text files, databases, digital photographs and other images and models as well as other records. These systems may link to other programs to perform some functions of the present invention. These systems may also access other databases such as bank accounts and credit accounts to perform their designated functions.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

I claim:

1. A dynamic electronic model and data storage system for electronically storing, maintaining and selectively providing information relating to a building, said system comprising:

a networked computer system for use by one or more users to access and input information relating to a structure, wherein the users access the information according to their access rights;

a database on the networked system for storing information regarding construction materials and details of construction for specific portions of the structure;

a graphical user interface on the networked computer system linked to said database, wherein the graphical user interface is a physically and dimensionally accurate 3-dimensional scaled electronic model of the current state of the structure:

links located on said electronic model linking the relevant information in said database concerning specific construction details and materials to the location on the electronic model corresponding to the actual location on the structure, wherein the physically accurate electronic model provides users with the information directly by selecting on the electronic model graphical user interface with an input device, including a mouse or touchscreen, a portion of the structure corresponding to the information, including the materials and construction details for that specific portion of the structure, said information accessed by users to obtain details of the structure, the users then using the accessed information to create estimates, formulate bids, and adjust claims without having to travel to the actual structure;

an associated data repository coupled to the networked computer system to preserve information relating to objects including appliances and furnishings inside the structure and warranties associated with those objects;

a data vault for depositing completed bids, estimates, aud responses for review by the structure owner and others with access rights to evaluate the information corresponding to the construction materials and details, appliances, furnishings, and warranties; and a database of digitized photographs of portions of the structure linked to corresponding locations on the graphical user interface available for viewing when the user selects a location on the graphical user interface.

2. The system of claim 1, wherein said graphical user interface is changed periodically to demonstrate actual progress during construction or remodeling.

3. The system of claim 1, wherein the associated data repository further stores at least one of:

(i) depreciation data;

(ii) maintenance information;

(iii) insurance coverage; and (iv) inventory of the physical contents of said structure.

4. The system of claim 1, wherein the graphical user interface also depicts sponsor advertising next to the electronic model of the structure.

5. The system of claim 1, wherein the associated data repository contains scheduling information and estimated times of completion for construction and remodeling projects relating to the structure.

6. The system of claim 1, wherein the networked computer system further comprises a private documents vault.

7. The system of claim 1, wherein the data vault is further accessible by insurance agents to provide quotes for a required insurance coverage or premium.

8. The system of claim 1, wherein the data vault is further accessible by an insurance or warranty claim adjuster to provide a claim or settlement.

* * * * *